United States Patent
Alvarez et al.

(10) Patent No.: US 9,537,753 B2
(45) Date of Patent: Jan. 3, 2017

(54) OPAQUE PROFILE IDENTIFIERS FOR PATH COMPUTATION ELEMENT PROTOCOL

(71) Applicant: CISCO TECHNOLOGY, INC., San Jose, CA (US)

(72) Inventors: Santiago Alvarez, Mountain View, CA (US); Muthurajah Sivabalan, Kanata (CA)

(73) Assignee: CISCO TECHNOLOGY, INC., San Jose, CA (US)

(*) Notice: Subject to any disclaimer, the term of this patent is extended or adjusted under 35 U.S.C. 154(b) by 187 days.

(21) Appl. No.: 14/304,439

(22) Filed: Jun. 13, 2014

(65) Prior Publication Data

US 2015/0249591 A1 Sep. 3, 2015

Related U.S. Application Data

(60) Provisional application No. 61/947,323, filed on Mar. 3, 2014, provisional application No. 62/000,982, filed (Continued)

(51) Int. Cl.
*H04L 12/721* (2013.01)
*H04L 12/24* (2006.01)
(Continued)

(52) U.S. Cl.
CPC ......... *H04L 45/123* (2013.01); *H04L 41/0803* (2013.01); *H04L 43/062* (2013.01); *H04L 47/724* (2013.01)

(58) Field of Classification Search
CPC ............. H04L 41/0803; H04L 41/0806; H04L 41/0816; H04L 43/062; H04L 45/123; H04L 45/124; H04L 45/128;H04L 45/1283; H04L 47/724; H04L 47/726; H04L 47/728
See application file for complete search history.

(56) References Cited

U.S. PATENT DOCUMENTS 8,885,463 B1 11/2014 Medved
2002/0023089 A1 2/2002 Woo
(Continued)

FOREIGN PATENT DOCUMENTS

IN WO 2012006785 A1 * 1/2012 ............. H04L 45/16

OTHER PUBLICATIONS

Ali, Z., et al., "Path Computation Element Communication Protocol (PCEP) Extensions for remote-initiated-GMPLS LSP Setup," PCE Working Group Internet Draft draft-ali-pce-remote-initiated-gmpls-lsp-03, Feb. 2014, 9 pages; http://tools.ietf.org/html/draft-ali-pce-remote-initiated-gmpls-lsp-00.

(Continued)

*Primary Examiner* — Khoa Huynh
(74) *Attorney, Agent, or Firm* — Patent Capital Group

(57) ABSTRACT

Methods and systems are disclosed for enabling centralized path definition and policy with distributed path setup, and centralized path setup control with distributed path utilization constraints. In one example, a path computation client (PCC) requests, utilizing opaque PCE profile identifiers, a path computation from a path computation element (PCE). The PCE profile identifier corresponds to path computation constraints, stored local to PCE, and are unknown to the PCC. Advantageously, the PCE profile identifiers allow the PCC to initiate path computation requests based on information local the PCC while leveraging centralized path computation by the PCE. In another example, a PCE requests, utilizing opaque PCC profile identifiers, that a PCC initiate a path. The PCC profile identifier corresponds to path usage parameter constraints, stored local to PCC, and are (Continued)

unknown to the PCE. Advantageously, the PCC identifiers allow the PCE to marshal path initiation while leveraging distributed resources to enforce compliance with usage parameters.

20 Claims, 22 Drawing Sheets

Related U.S. Application Data on May 20, 2014, provisional application No. 62/009,051, filed on Jun. 6, 2014.

(51) Int. Cl.
H04L 12/913 (2013.01)
H04L 12/26 (2006.01)

(56) References Cited

U.S. PATENT DOCUMENTS

| | | | |
|---|---|---|---|
| 2007/0217419 | A1 | 9/2007 | Vasseur |
| 2008/0225723 | A1* | 9/2008 | Lee ............... H04J 14/0271 370/235 |
| 2013/0007266 | A1 | 1/2013 | Jocha |
| 2014/0098710 | A1* | 4/2014 | Ong ............... H04L 41/12 370/255 |
| 2015/0249592 | A1 | 9/2015 | Alvarez et al. |
| 2015/0249593 | A1 | 9/2015 | Alvarez et al. |

OTHER PUBLICATIONS

Alvarez, S., et al., "PCE Path Profiles," Internet Engineering Task Group Internet Draft draft-alvarez-pce-path-profiles-00, Oct. 2013, 9 pages; http://tools.ietf.org/html/draft-alvarez-pce-path-profiles-00.

Bradner, S., "Key words for use in RFCs to Indicate Requirement Levels," Network Working Group RFC 2119, Mar. 1997, 3 pages; http://tools.ietf.org/html/rfc2119.

Crabbe, E., et al., "PCEP Extensions for PCE-initiated LSP Setup in a Stateful PCE Model," Network Working Draft draft-ietf-pce-pce-initiated-lsp-00, Oct. 9, 2012, 14 pages; http://tools.ietf.org/html/draft-crabbe-pce-pce-initiated-lsp-00.

Crabbe, E., et al., "PCEP Extensions for Stateful PCE," PCE Working Group Internet Draft draft-ietf-pce-stateful-pce-08, Feb. 2014, 47 pages; http://tools.ietf.org/html/draft-ietf-pce-stateful-pce-08.

Farrel, A., et al., "A Path Computation Element (PCE)-Based Architecture," Network Working Group RFC 4655, Aug. 2006, 40 pages; http://tools.ietf.org/html/rfc4655.

Margaria, C., et al., "PCEP extensions for GMPLS", Network Working Group Internet Draft draft-ietf-pce-gmpls-pcep-extensions-09, Feb. 2014, 35 pages; http://tools.ietf.org/html/draft-ietf-pce-gmpls-pcep-extensions-09.

Sivabalan, S., et al., "PCEP Extensions for Segment Routing," Network Working Group Internet Draft draft-sivabalan-pce-segment-routing-02, Oct. 2013, 18 pages http://tools.ietf.org/pdf/draft-sivabalan-pce-segment-routing-02.pdf.

Vasseur, J.P., et al., "Path Computation Element (PCE) Communication Protocol (PCEP)," Network Working Group RFC 5440, Mar. 2009, 87 pages; http://tools.ietf.org/html/rfc5440.

Zhao, Q., et al., "Extensions to the Path Computation Element Communication Protocol (PCEP) for Point-to-Multipoint Traffic Engineering Label Switched Paths," Network Working Group RFC 6006, Sep. 2010, 33 pages; http://tools.ietf.org/html/rfc6006.

U.S. Appl. No. 14/309,338, filed Jun. 19, 2014, entitled "Opaque Profile Identifiers for Path Computation Element Protocol," Inventor(s): Santiago Alvarez, et al.

U.S. Appl. No. 14/309,425, filed Jun. 19, 2014, entitled "Opaque Profile Identifiers for Path Computation Element Protocol," Inventor(s): Santiago Alvarez, et al.

USPTO Feb. 25, 2016 Non-Final Office Action from U.S. Appl. No. 14/309,338.

USPTO Feb. 26, 2016 Non-Final Office Action from U.S. Appl. No. 14/309,425.

Sultanik, Evan A., et al., "Service Discovery on Dynamic Peer-to-Peer Networks Using Mobile Agents," 3rd Internatiolnal Workshop, APsPC 2004, New York, New York, Jul. 19, 2004; 12 pages.

Stoica, Ion, et al., "Core-stateless fair queueing: a scalable architecture to approximate fair bandwidth allocations in high-speed networks," ACM SIGCOMM '98, Applications, Technologies, Architectures and Protocols for Computer Communication, Vancouver, British Columbia, Aug. 31-Sep. 4, 1998; 13 pages.

Stoica, Ion, et al., "LIRA: An Approach for Service Differentiation in the Internet," NOSSDAV '98, The 8th International Workshop on Network and Operating Systems Support for Digital Audio and Video, New Hall, Cambridge, UK, Jul. 8-10, 1998; 14 pages.

Stoica, Ion, et al., "Per Hop Behaviors Based on Dynamics Packet States," Internet Engineering Task Force draft-stoica-diffserv-dps-oo-txt, Feb. 1999; 20 pages.

Stoica, Ion, et al., "Providing Guaranteed Services Without Per Flow Management", Proceedings of SIGCOMM'99, Boston, MA, Sep. 1999; 14 pages.

Stoica, Ion, "Dynamic Packet State (DPS)," first published on or about Sep. 29, 2001; 2 pages https://web.archive.org/web/20010429183322/http://www.cs.berkeley.edu/~istoica/DPS/.

\* cited by examiner

| PCE PROFILE IDENTIFIER | PROFILE DEFINITION |
|---|---|
| 10 | BANDWIDTH 0<br>TE METRIC |
| 20 | BANDWIDTH 100 Mbps<br>AFFINITY RED (ADMINISTRATION GROUP)<br>IGP METRIC |
| 30 | POLICY DISJOINT-PATH |

FIG. 11

| PCC PROFILE IDENTIFIER | PROFILE DEFINITION |
|---|---|
| 10 | AUTOROUTE ANNOUNCE |
| 20 | TARGETED LDP |
| 30 | FORWARD-CLASS 3 |
| 40 | FORWARD-CLASS 3 |
| 50 | BFD (3X3) |

FIG. 18A

| PCC PROFILE IDENTIFIER | PROFILE DEFINITION |
|---|---|
| 10 | AUTOROUTE ANNOUNCE TARGETED LDP |
| 20 | BFD AUTOROUTE ANNOUNCE FORWARD-CLASS 5 |
| 30 | AUTO-BW COLLECT LOAD-INTERVAL 30 |

FIG. 18B

| SET (UNORDERED) | LIST (ORDERED USING DEPTH-FIRST SEARCH) | | |
|---|---|---|---|
| [tree with nodes a, 1, 2] | [tree with nodes b, 5, 1, 8] | [tree with nodes c, 6, 1, 2, 7, 3, 2, 4, 1] | [tree with nodes d, 9, 1, 4, 7, 3, 5, 6, 1, 4] |
| • REQUEST LOW LATENCY PATH {1}<br>• REQUEST EXCLUSION OF INTERNATIONAL LINKS {2}<br>• PROFILE OBJECT CONTENTS {1, 2} | • REQUEST LATENCY (5) WITH MINIMUM PARAMETER (1)<br>• REQUEST DISJOINTNESS (8)<br>• PROFILE OBJECT CONTENTS (5, 1, 8) | • REQUEST LATENCY (6) WITH MINIMUM AND MAXIMUM PARAMETERS (1, 2)<br>• INVOKE IPv6 POLICY (7) WITH ADDRESS (3, 2, 4, 1)<br>• PROFILE OBJECT CONTENTS (6, 1, 2, 7, 3, 2, 4, 2) | • REQUEST DISJOINTNESS (9) WITH RESPECT TO SERVICE INSTANCE PARAMETERS (1, 4)<br>• REQUEST LATENCY (6) WITH MINIMUM AND MAXIMUM PARAMETERS (1, 4) IF TIME BETWEEN PARAMETERS (3, 5)<br>• PROFILE OBJECT CONTENTS (9, 1, 4, 7, 3, 5, 6, 1, 4) |
| • REQUEST LOW LATENCY PATH {1}<br>• REQUEST EXCLUSION OF INTERNATIONAL LINKS {2}<br>• PROFILE OBJECT CONTENTS {1, 2} | • REQUEST LATENCY WITH MINIMUM PARAMETER (5.1)<br>• REQUEST DISJOINTNESS (8)<br>• PROFILE OBJECT CONTENTS (5.1, 8) | • REQUEST LATENCY WITH MINIMUM AND MAXIMUM PARAMETERS (6.1, 6.2)<br>• INVOKE IPv6 POLICY WITH ADDRESS (7.4)<br>• PROFILE OBJECT CONTENTS (6.1, 6.2, 7.3, 7.2, 7.4, 7.2) | • REQUEST DISJOINTNESS WITH RESPECT TO SERVICE INSTANCE PARAMETERS (9.1, 9.4)<br>• REQUEST LATENCY WITH MINIMUM AND MAXIMUM PARAMETERS (6.1, 6.4) IF TIME BETWEEN PARAMETERS (7.3, 7.5)<br>• PROFILE OBJECT CONTENTS (9.1, 9.4, 7.3, 7.5, 6.1, 6.4) |

● PROFILE OBJECT     ⊙ EXPLICITLY CONFIGURED/MATCHED ON RECEIVER     ⓜ PARAMETER TO PARENT

FIG. 21

OPAQUE PROFILE IDENTIFIERS FOR PATH COMPUTATION ELEMENT PROTOCOL

CROSS-REFERENCE TO RELATED APPLICATIONS

This application claims the benefit of priority under 35 U.S.C. §119(e) to U.S. Provisional Application Ser. No. 61/947,323, entitled "CENTRALIZED PATH DEFINITION WITH DISTRIBUTED PATH SETUP CONTROL" filed Mar. 3, 2014, to U.S. Provisional Application Ser. No. 62/000,982, entitled "CENTRALIZED PATH DEFINITION WITH DISTRIBUTED PATH SETUP CONTROL" filed May 20, 2014, and to U.S. Provisional Application Ser. No. 62/009,051, entitled "PATH SETUP WITH ENCODED PATH PARAMETERS" filed Jun. 6, 2014, each of which is hereby incorporated by reference in their entirety.

TECHNICAL FIELD

This disclosure relates in general to the field of network communications and, more particularly, to utilizing opaque identifiers in path computation element communication protocol (PCEP) for centralized path definition and policy with distributed path setup control, and centralized path setup control with distributed path utilization constraints.

BACKGROUND

Modern networks may include distributed and centralized components. For example, a network may include many distributed nodes (e.g., routers) and may include a central controller for managing the nodes. In the case of network elements that compute paths from a source to a destination (e.g., path computation elements) and network elements that request path computation (e.g., path computation clients), the network elements may either be distributed or centralized.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 11 is a table illustrating exemplary PCE profiles, according to an embodiment of the present disclosure.

FIGS. 18A and 18B are tables illustrating exemplary PCC profiles, according to one or more embodiments of the present disclosure.

FIG. 21 is a table of exemplary encodings for profile objects, according to an embodiment of the present disclosure.

DETAILED DESCRIPTION OF EXAMPLE EMBODIMENTS

Overview

Figure 1:
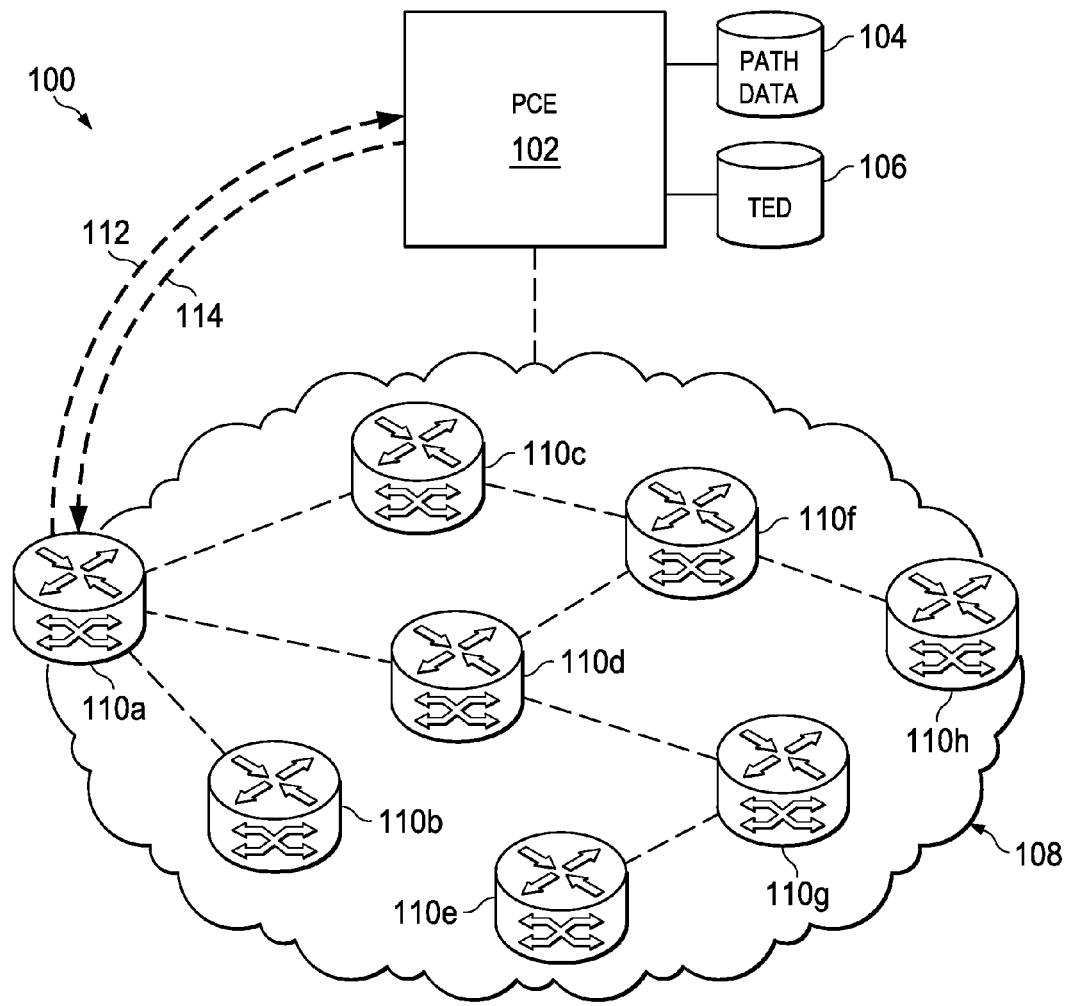
FIG. 1 is a simplified schematic diagram illustrating network according to an embodiment of the disclosure.

In an embodiment, a method for requesting path computation by a path computation client (PCC) comprises storing, in a memory accessible by a path computation client (PCC), at least one profile identifier; generating, by the PCC, a path computation element communication protocol (PCEP) request message comprising a destination identifier and a profile identifier of the at least one profile identifier, wherein the generating the PCEP request message is in response to detecting a network state that is local to the PCC; transmitting, from the PCC, the PCEP request message to a path computation element (PCE); and receiving, by the PCC from the PCE, a PCEP reply message comprising a path from the PCC to a destination associated with the destination identifier, wherein the path satisfies at least one path constraint, stored remote from the PCC, corresponding to the profile identifier.

In an embodiment, a method for replying, by a path computation element (PCE), to a path computation request comprises storing, in a memory accessible by a path computation element (PCE), at least one profile identifier and at least one corresponding path constraint; receiving, at the PCE from a path computation client (PCC), a path computation element communication protocol (PCEP) request message comprising a destination identifier and a profile identifier of the at least one profile identifier, wherein the PCC generated the PCEP request message in response to detecting a network state that is local to the PCC; generating, by the PCE, a PCEP reply message comprising a path parameters describing a path from the PCC to a destination associated with the destination identifier, wherein the path computation parameters are computed by the PCE based on the at least one corresponding path constraint for the profile identifier.

In an embodiment, a system for communication, comprises a path computation element (PCE) comprising a memory storing at least one profile identifier and at least one corresponding path constraint; a path computation client (PCC) comprising a memory storing the at least one profile identifier and not storing the at least one corresponding path constraint; a communication media operatively coupled to the PCE and the PCC and enabling communication between the PCE and the PCC; wherein the PCC transmits, to the PCE via the communication media, a path computation element communication protocol (PCEP) request message comprising a destination identifier and a profile identifier of the at least one profile identifier, wherein the generating the PCEP request message is in response to detecting a network state that is local to the PCC and the PCE has no information regarding the network state that is local to the PCC; and wherein the PCE generates a PCEP reply message, for transmission to the PCC via the communication media, comprising a path from the PCC to a destination associated with the destination identifier, and the path is computed by the PCE based on the at least one corresponding path constraint for the profile identifier.

In an embodiment, at least one computer-readable non-transitory medium comprising one or more instruction, that when executed by one or more processors configure the one or more processor to perform one or more operations comprises storing, in a memory accessible by a path computation client (PCC), at least one profile identifier; generating, by the PCC, a path computation element communication protocol (PCEP) request message comprising a destination identifier and a profile identifier of the at least one profile identifier, wherein the generating the PCEP request message is in response to detecting a network state that is local to the PCC; transmitting, from PCC, the PCEP request message to a path computation element (PCE); and receiving, by the PCC from the PCE, a PCEP reply message comprising a path from the PCC to a destination associated with the destination identifier, wherein the path satisfies at least one path constraint, stored remote from the PCC, corresponding to the profile identifier.

In an embodiment, at least one computer-readable non-transitory medium comprising one or more instruction, that when executed by one or more processors configure the one or more processor to perform one or more operations comprises storing, in a memory accessible by a path computation element (PCE), at least one profile identifier and at least one corresponding path constraint; receiving, at the PCE from a path computation client (PCC), a path computation element communication protocol (PCEP) request message comprising a destination identifier and a profile identifier of the at least one profile identifier, wherein the PCC generated the PCEP request message in response to detecting a network state that is local to the PCC; generating, by the PCE, a PCEP reply message comprising a path from the PCC to a destination associated with the destination identifier, wherein the path is computed by the PCE based on the at least one corresponding path constraint for the profile identifier.

In an embodiment, a method for initiating a path by a path computation element (PCE) comprises storing, in a memory accessible by a path computation element (PCE), at least one profile identifier; computing, by the PCE, path parameters describing a path from a path computation client (PCC) to a path destination; generating, by the PCE, a path computation element communication protocol (PCEP) initiate message comprising the path parameters, the path destination, and a profile identifier of the at least one profile identifier; wherein the PCEP initiate message is generated in response to a request message received by the PCE; and transmitting, from the PCE, the PCEP initiate message to the PCC.

In an embodiment, a method for generating a path by a path computation client (PCE) comprises storing, in a memory accessible by a path computation client (PCC), at least one profile identifier and at least one corresponding path usage parameter; receiving, at the PCC from a path computation element (PCE), a path computation element communication protocol (PCEP) initiate message comprising the path parameters, the path destination, and a profile identifier of the at least one profile identifier, wherein the PCEP initiate message is generated in response to a request message received by the PCE; generating, by the PCC, the path based on the path parameters; wherein utilization of the path conforms to the at least one path usage parameter corresponding to the profile identifier associated with the path.

In an embodiment, a system for communication comprises a path computation client (PCC) comprising a memory storing at least one profile identifier and at least one corresponding path usage parameter; a path computation element (PCE) comprising a memory storing the at least one profile identifier and not storing the at least one corresponding usage parameter; a communication media operatively coupled to the PCE and the PCC and enabling communication between the PCE and the PCC; wherein the PCE transmits to the PCC, via the communication media, a path computation element communication protocol (PCEP) initiate message comprising path parameters and a profile identifier of the at least one profile identifier, the PCEP initiate message being generated in response to a request message received by the PCE; and wherein the PCC generates the path based on the path parameters; wherein utilization of the path follows the at least one corresponding path usage parameter for the profile identifier.

In an embodiment, at least one computer-readable non-transitory medium comprising one or more instruction, that when executed by one or more processors configure the one or more processor to perform one or more operations comprises storing, in a memory accessible by a path computation element (PCE), at least one profile identifier; computing, by the PCE, path parameters describing a path from a path computation client (PCC) to a path destination; generating, by the PCE, a path computation element communication protocol (PCEP) initiate message comprising the path parameters, the path destination, and a profile identifier of the at least one profile identifier; wherein the PCEP initiate message is generated in response to a request message received by the PCE; and transmitting, from the PCE, the PCEP initiate message to the PCC.

In an embodiment, at least one computer-readable non-transitory medium comprising one or more instruction, that when executed by one or more processors configure the one or more processor to perform one or more operations comprises storing, in a memory accessible by a path computation client (PCC), at least one profile identifier and at least one corresponding path usage parameter; receiving, at the PCC from a path computation element (PCE), a path computation element communication protocol (PCEP) initiate message comprising the path parameters, the path destination, and a profile identifier of the at least one profile identifier, wherein the PCEP initiate message is generated in response to a request message received by the PCE; generating, by the PCC, the path based on the path parameters; wherein utilization of the path follows the at least one path usage parameter corresponding to the profile identifier.

In an embodiment, a method comprises storing, in a memory accessible by a first network element, an ordered list comprising a profile identifier and at least one attribute associated with the profile identifier, wherein the profile identifier and the at least one attribute are provided in a particular order in the ordered list; receiving a path computation element communication protocol (PCEP) message, from a second network element, comprising at least one profile identifier and at least one argument value associated with each of the at least one profile identifier; in response to determining that the at least one profile identifier in the PCEP message comprises the profile identifier, processing the PCEP message to identify the at least one argument value based on the particular order in the ordered list; and executing, by the first network element, an action based on the at least one argument value identified in the processing.

In an embodiment, a method comprises generating, by a first network element, a path computation element communication protocol (PCEP) message comprising at least one profile identifier and at least one argument value associated with each of the at least one profile identifier, wherein the at least one profile identifier and at least one argument value are provided in an order in the PCEP message; and transmitting the PCEP message to a second network element, wherein the PCEP message causes the second network element to execute an action in response to determining that the order in the PCEP message corresponds to a particular order of a profile identifier and at least one attribute associated with the profile identifier stored on the second network element.

In an embodiment, a system comprises a first network element comprising a memory storing an ordered list comprising at least one profile identifier and at least one attribute associated with the at least one profile identifier, wherein the at least one profile identifier and the at least one attribute are provided in a particular order in the ordered list; a second network element comprising a memory storing a profile identifier and at least one argument value associated with the profile identifier; a communication media operatively coupled to and enabling communication between the first network element and the second network element; wherein the second network element transmits a path computation element communication protocol (PCEP) message, to the first network element via the communication media, comprising the profile identifier and the at least one argument value associated with the profile identifier; and wherein the first network element, processes the PCEP message to identify the at least one argument value based on the particular order in the ordered list and executes an action based on the at least one argument value identified in the processing.

In an embodiment, at least one computer-readable non-transitory medium comprising one or more instruction, that when executed by one or more processors configure the one or more processor to perform one or more operations comprises storing, in a memory accessible by a first network element, an ordered list comprising a profile identifier and at least one attribute associated with the profile identifier; wherein the profile identifier and the at least one attribute are provided in a particular order in the ordered list; receiving a path computation element communication protocol (PCEP) message, from a second network element, comprising at least one profile identifier and at least one argument value associated with each of the at least one profile identifier; in response to determining that the at least one profile identifier in the PCEP message comprises the profile identifier, processing the PCEP message to identify the at least one argument value based on the particular order in the ordered list; and executing, by the first network element, an action based on the at least one argument value identified in the processing.

In an embodiment, at least one computer-readable non-transitory medium comprising one or more instruction, that when executed by one or more processors configure the one or more processor to perform one or more operations comprises generating, by a first network element, a path computation element communication protocol (PCEP) message comprising at least one profile identifier and at least one argument value associated with each of the at least one profile identifier, wherein the at least one profile identifier and at least one argument value are provided in an order in the PCEP message; and transmitting the PCEP message to a second network element, wherein the PCEP message causes the second network element to execute an action in response to determining that the order in the PCEP message corresponds to a particular order of a profile identifier and at least one attribute associated with the profile identifier stored on the second network element.

Example Embodiments

Network service state often resides distributed in the network. Controlling the setup of network paths using the distributed network service state, while maintaining centralized path definition and policy for path computation can present a challenge. In this context, path definition refers to a detailed description of path parameters (path attributes, path description parameters) and/or tasks required to identify the path (e.g. path computation). Some approaches, such as Multiprotocol Label Switching (MPLS) Traffic Engineering (TE) and segment routing (SR) TE, may support distributed path definition with distributed path setup control, or centralized path definition with centralized path setup control. Path parameters may include parameters Explicit Route Object (ERO), bandwidth, affinities, etc. for Resource Reservation Protocol-Traffic Engineering (RSVP-TE), Segment Routing (SR), label stack, etc. In distributed path definition with distributed path setup control, a path (tunnel) configuration resides on each head end, which controls when a path is setup. In these systems, no Path Computation Element (PCE) used. In centralized path definition with centralized path setup control, PCE-initiated path setup enables an operator to centralize both path definition and path setup.

An existing challenge is to centralize path definition and policy with distributed path setup control. Centralizing path definition and policy can simplify network operations. Distributing setup control (e.g., to router and switches in the network) allows the network to leverage its distributed state (e.g., network state information that is local to a router or switch) to make decisions as to which point in time (and/or in which conditions/states) to set up a path. For example, routing and signaling information can define how network services (e.g., Layer 3 Virtual Private Networks (L3VPN), Internet Protocol version 4 (IPv4), Internet Protocol version 6 (IPv6), Virtual Private LAN service (VPLS), etc.) can signal path preferences via their control plane (e.g., using Border Gateway Protocol (BGP) or Label Distribution Protocol (LDP)). The service state in combination with local policies and/or configuration can trigger the creation of paths (e.g., Traffic Engineered Label Switched paths (TE LSPs), Segment Routed Traffic Engineering paths (SR-TE paths), etc.), between Provider Edge (PE) devices. In one example, the systems and methods described herein relocate some policies and/or configuration to a central path computation element (PCE) while still allowing service nodes to trigger (PCC-initiated) the creation of paths (e.g., TE LSPs and/or SR-TE paths) based on distributed service state. Centralized path definition/computation provides a significant reduction on operational complexity while distributed path creation makes use of network intelligence that doesn't reside anywhere else. In another example, the systems and methods described herein allow centralized controllers/processors to instruct path creation (PCE-initiated), while leveraging nodes (e.g., router, switches, etc.) to store and locally enforce path usage constraints, which may specify the way in which the path can be utilized.

FIG. 1 is a simplified schematic diagram illustrating network according to an embodiment of the disclosure. FIG. 1 illustrates system 100, which comprises a PCE 102, a path database 104, a traffic engineering (e.g., network topology) database (TED) 106, and a network 108. Network 108 includes routers 110a-110h, each of which is operatively coupled to at least one other node in the network. PCE 102 is operatively coupled to path database 104, TED database 106, and a network 108. PCE 102 may communicate with any node within the network (e.g., any of routers 110a-110h) or nodes from other networks. For simplicity, PCE 102 is shown in communication with router 110a. PCE 102 is able to transmit a message 114 to router 110a in network 108. Router 110a is able to transmit a message 112 to a PCE 102.

In an implementation, Path Computation Element (PCE) 102 may be a router, a switch, a server, or any other component capable of computing a path from a source to a destination with a network (e.g., network 108) subject to at least one path computation constraint. In some examples, PCE 102 is a server located remote from the network. In other examples, PCE 102 is a node within the network (e.g., router 110b). PCE 102 may retrieve data from either of path database 104, TED database, 106, or from other data sources (e.g., third-party databases) (not shown). In some examples, the PCE may retrieve path parameters (or paths) from a database, in response to receiving a request to determine a path.

Path database 104 and TED database 106 maybe implemented as, e.g., SQL databases, MySQL databases, Hadoop databases, or may be any memory element (e.g., RAM, flash) accessible to PCE 102.

As an illustrative example, routers 110a and 110f may be service nodes (e.g. L3VPN, Layer 2 Virtual Private Network (L2VPN) endpoints) that exchange service state via BGP and LDP. Router 110f signals (e.g., by sending a message) a path preference for a particular service (e.g., using a BGP community value). In an implementation, a message identifying that the peer node is associated with a network service is at least one of: an attribute corresponding to the network service advertised, a community, AS path, address family, a prefix, and/or a Label Distribution Protocol (LDP) signaling of the service. The router 110a receives, from router 110f (a peer node), the signal identifying that the peer node is associated with the service. Router 110a may access a local policy, which provides a correspondence between services (or a subset of a service, e.g., a prefix) and a forwarding preference). Router 110a may also access a local path template, which provides correspondence between forwarding preferences and one or more profile identifiers (profile IDs). The profile IDs may be opaque from the with respect to the protocol. Thus, the semantics (e.g., the contents of a profile definition) of the profile may not be defined by the protocol. Each system may define the semantics of the profile (and profile IDs) based an agreement between peers. Using the policy, the router 110a determines which forwarding preference corresponds to the network service (or network state) identified in the message. In this example, router 110a may act as a path computation client (PCC). Router 110a may check whether a path, of the identified forwarding preference, already exists towards 110f. In response to determining that a path from router 110a to router 110f (i.e., the peer node) does not exist for the determined forwarding preference, router 110a uses the local path template to determine whether a PCE can compute paths of the determined forwarding preference (e.g., as indicated by the presence of a PCE profile id for the determined forwarding preference in the local path template). If so, router 110a uses the local path template to identify the one or more profile identifiers corresponding to the determined forwarding preference. Router 110a may generate a request message (e.g., a path computation request) including the identified one or more profile IDs (or a subset thereof) associated with the local path template. Then router 110a, acting as a path computation client (PCC), sends the path computation request (e.g., using PCE Communication Protocol (PCEP) PCReq) to PCE 102 including the one or more profile IDs (or a subset thereof) associated with the local path template. Path Computation Element (PCE) Communication Protocol (PCEP) (i.e., RFC 5440) is a standard published by the Internet Engineering Task Force (IETF) for communication between PCEs and PCCs. PCEP specifies interactions that allow PCCs to request path computation from PCEs, and for PCEs to reply to the request.

In another illustrative example, a network management application may require a path for a new network service. The network management application may use an interface of a controller (e.g., a northbound interface of a software defined network (SDN) controller) to instruct a PCE (e.g., PCE 102) to create the path in the network. The instruction may be sent using representational state transfer (REST) call by the network management application to the PCE. One or more profile identifiers, included in the instruction, may each correspond to path usage parameters, which may define restrictions on how the path may be utilized. Although the profile identifiers are sent to PCE 102, the PCE may not have access to the semantics of the profile identifiers. Instead, the semantics may have been defined by the network management application and provisioned (e.g., using Network Configuration Protocol (Netconf)) on a PCC (e.g. router 110g). Upon receiving the instruction, PCE 102 sends a path initiate request (e.g., using a PCE Communication Protocol (PCEP)

PCInitiate message) to the PCC 102 including the one or more profile IDs (or a subset thereof), which were received directly from the PCE. The PCC may use the semantics provisioned by the network management application identify the path usage parameter. The PCC may set up the path and enforce any use of the path to conform to the path usage parameter.

A new PCEP extension, presented in present specification, adds opaque identifiers to path computation element communication protocol (PCEP) messages for centralized path definition and policy with distributed path setup control, and centralized path setup control with distributed path utilization constraints. For example, the PCEP extension may allow a PCC to send, to a PCE, a PCEP message comprising one or more profile identifiers that correspond to path computation parameters (or path constraints), which influence the path computation performed by the PCE. This is an example of a PCC-initiated path. Using the profile identifiers, distributed PCCs may control the timing and/or conditions under which paths are created and may leverage profile definitions stored on the PCE (remote from the PCC). In another example, the PCEP extension may allow a PCE to send, to a PCC, a PCEP message comprising one or more profile identifiers that correspond to path usage parameters, which may define restrictions on how a path may be utilized. This is an example of a PCE-initiated path. System 1000 is not limited to either PCC-initiated paths or PCE-initiated paths.

Figure 2:
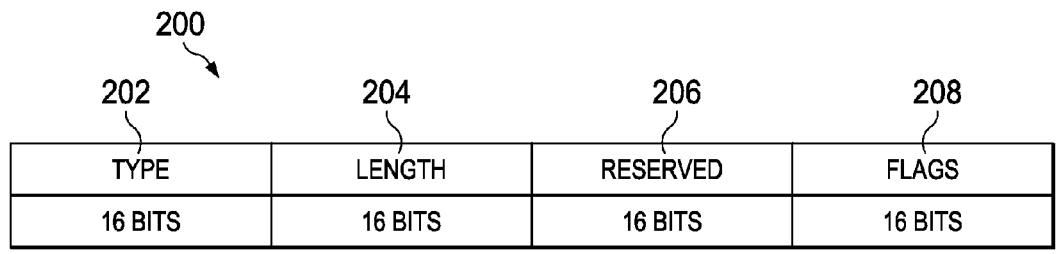
FIG. 2 illustrates a profile capability Type-Length-Value (TLV) extension to the PCEP OPEN object, according an embodiment of the present disclosure.
Figure 3:
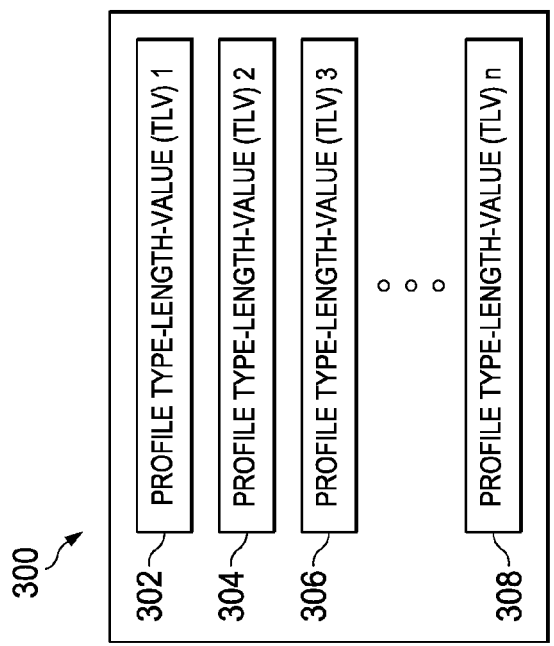
FIG. 3 illustrates a profile object, which extends PCEP according to an embodiment of the present disclosure.
Figure 4:
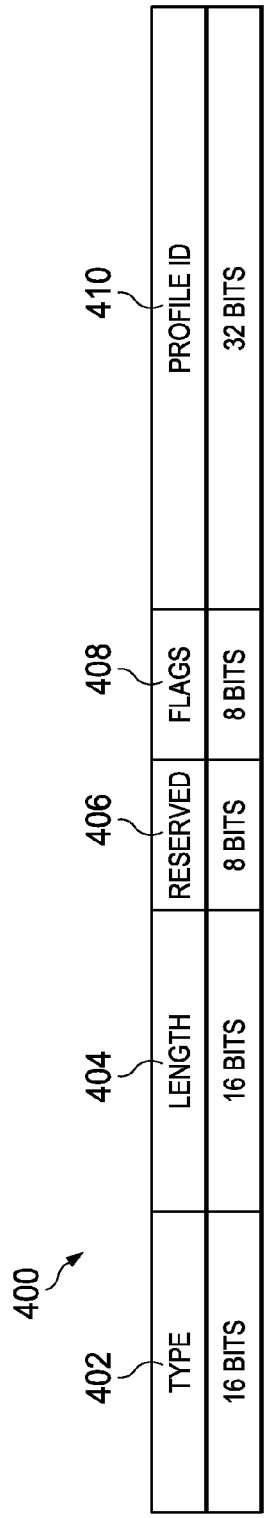
FIG. 4 illustrates a profile identifier TLV, which extends PCEP, according to an embodiment of the present disclosure.

For example, FIGS. 2, 3, 4 illustrate exemplary PCEP extensions. FIG. 2 illustrates a new profile capability Type-Length-Value (TLV) extension to the PCEP OPEN object, according an embodiment of the present disclosure. The profile capability Type-Length-Value (TLV) 200 comprises a 16-bit type 202, a 16-bit length 204, a 16-bits reserved 206, and 16 bits for flags 208. PCEs and PCCs utilize the profile capability TLV to advertise their capability to process profile identifiers (e.g., during session initialization). Communication using the profiles in the extension is only possible if both peers (e.g., the PCE and the PCC) advertise their capability to send and/or receive profile identifiers. After establishing that both peers are capable of communicating (i.e., sending, receiving, processing, etc.) profile identifiers, the peers may begin transmitting messages between one another that contain one ore more profile identifiers. FIG. 3 illustrates a profile object 302, which extends PCEP according to an embodiment of the present disclosure. A PCEs and PCCs may transmit profile objects between one another. Profile objects have a variable length and may contain one or more profile identifier (ID) TLVs. For example, profile object 300 includes profile ID TLV 1 (302), profile ID TLV 2 (304), profile ID TLV 3 (306), . . . , and profile ID TLV n (308). A profile object may be transmitted in a PCEP message (e.g., in a PCEP PCReq, PCInitiate and/or PCUpd message). Upon receiving a PCEP message containing a profile object, a PCC or PCE may process the message (and the profile object) to identify one or more profile identifiers (i.e., profile ID TLVs) within the message. The order of the profile IDs is not specified by PCEP protocol. Profile ID TLVs (profile IDs) in a profile objects may be processed in the order in which they are provided in the message. According to the new PCEP extension in the present disclosure, the order of the profile IDs in the profile object may advantageously ordered to match a particular order of profile IDs a profile definition and may encode a relationship between the profile IDs. FIG. 4 illustrates an embodiment of a profile ID TLV, which extends PCEP, according to an embodiment of the present disclosure. Profile ID TLV 400 comprises a 16-bit type 402, a 16-bit length 404, an 8-bit reserved portion 406, and 8-bits for flags 408, and 32-bit profile identifier 410. The profile identifier 410, may be utilized as a PCC profile identifier or as PCE profile identifier (for PCE-initiated path and PCC-initiated paths, respectively).

A further extension to PCEP may include a PCInitiate message, which allows a PCC uses profile identifiers to select path parameters or path policies to be applied during the instantiation of the path. An exemplary implementation of the PCInitiate message may be:

```
<PCInitiate Message> ::= <Common Header>
                        <PCE-initiated-lsp-list>
    Where:
        <PCE-initiated-lsp-list> ::= <PCE-initiated-lsp-request>
                                     [<PCE-initiated-lsp-list>]
        <PCE-initiated-lsp-request> ::=
        (<PCE-initiated-lsp-instantiation>|
            <PCE-initiated-lsp-deletion>)
        <PCE-initiated-lsp-instantiation> ::= <SRP>
                    <LSP>
                    <END-POINTS>
                    <ERO>
                    [PATH-PROFILE>
                    [<attribute-list>]
        <PCE-initiated-lsp-deletion> ::= <SRP>
                    <LSP>
```

Figure 5:
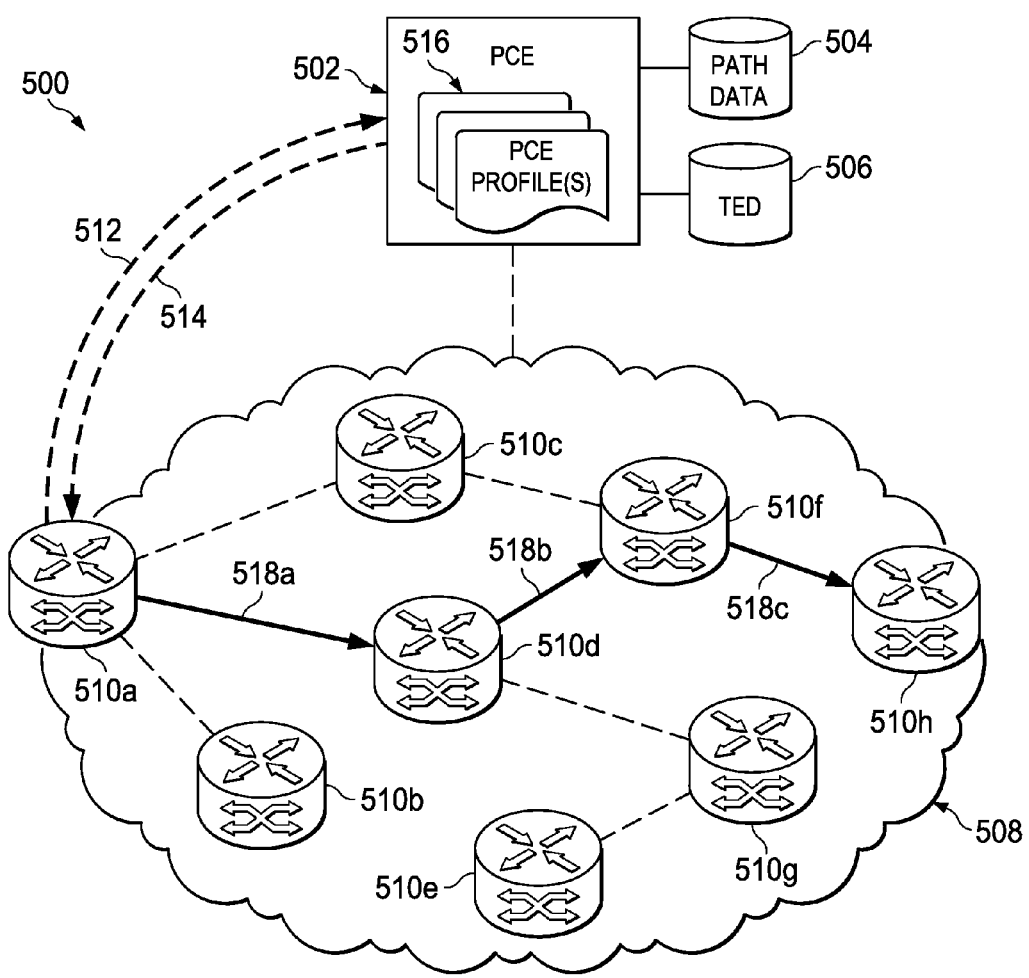
FIG. 5 is a simplified schematic diagram illustrating a system for PCC-initiated paths, according to an embodiment of the disclosure.

FIG. 5 is a simplified schematic diagram illustrating network supporting PCC-initiated paths, according to an embodiment of the disclosure. In system 500, a PCC (e.g., router 510a) may initiate path creation. The components in system 500 (FIG. 5) are similar to the components in system 100 (FIG. 1). A key difference between systems 100 and 500 is that system 500 comprises PCE profiles 516, stored local to the PCE. In one embodiment, PCE profiles 516 are implemented using the extension shown in FIGS. 2-4, and/or 22; in such a case, the PCE profiles 516 corresponds to the profile object 300. PCE profiles 516 may include PCE profile identifiers and corresponding a constraint(s), which define the profiles. In this example, the PCC profiles (IDs and definitions) are stored only on the PCE and not on the PCC (in this case router 510a). The PCC only stores the PCE profile identifiers and not the profile definition. The PCC may have no information regarding the path constraints (e.g., the PCE profile definition) that correspond to the profile identifier. Storage of the PCE profile definition on the PCE advantageously centralizes path definition and policy on the PCE, while allowing the PCC (e.g., router 510a) to create a path based on a (distributed) network state local to the PCC.

Using a PCEP extension, a PCC (router 510a) may generate a path computation request 512 specifying a path destination and a profile identifier. Upon receiving the path computation request, the PCE may query a path database (e.g., databases 504 and/or 506), apply path constraints associated with the profile (e.g., PCE profile(s) 516), perform path computation, and reply with a path computation reply (e.g., a PCEP PCRep message) 514, which includes all the path description parameters (e.g., Explicit Route Object (ERO), bandwidth, affinities, etc. for Resource Reservation Protocol-Traffic Engineering (RSVP-TE) or label stack, etc. for Segment Routing). Upon receiving the path computation reply (e.g., a PCEP PCRep message) the PCC may setup a path 518 (e.g., instantiate the path) to the path destination based on the path parameters.

The PCC (router 510*a*) may include additional parameters in the path computation request message (PCRequest). The additional parameters may or may not override the PCE profile. The additional parameters can be used to selectively augment the centralized profiles (e.g., profiles 516). For example, a PCC may send a message that not only includes a profile identifier but also explicitly specifies a minimum amount of bandwidth needed through the requested path. The PCE would compute a path using constrains that correspond to the profile identifier as well as the bandwidth constrain. The PCE may make use of a path policy engine (e.g., policy agent 1316 in FIG. 13B) to determine if these additional parameters should be considered for a given request. Policy engine can also enforce additional path computation constraints based on other information available to the PCE (e.g. path database 504, TED database 506). Note that the protocol and framework described herein can be applied in any network that uses a path computation element(s) and has distributed state that can trigger the setup of a path (e.g. Internet Protocol(IP)/MPLS networks with RSVP-TE, IP/MPLS networks using segment routing TE, networks using Segment Routing with IPv6 traffic encapsulation, etc.). While system 500 is discussed in the context of the PCC initiating a path, in some implementations, a PCE may also initiate a path. For example, a PCE may transmit a path initiation message to the PCC instructing the PCC to instantiate a path to a different destination.

In an implementation, system 500 may comprise both PCE profiles 516 and PCC profiles (not shown), which may be stored on a PCC (e.g., router 510*a*). For example, the PCC may have a plurality of locally configured PCC profiles, but doesn't necessarily know which one to apply to the path. In this case, the PCC can place a path computation request including one or more PCE profile IDs (i.e., the IDs used by the PCE uses to identify the parameters for path computation). Upon received the path computation request, the PCE may use the PCE profile IDs to identify one or more PCC profile IDs that it should reference in its response to the PCC (e.g., using a memory that stores a mapping between PCE profile IDs and PCC profile IDs). The PCE may then generate a path computation reply (e.g., a PCEP PCRep message) include the identified one or more PCC profile IDs, which references the profiles configured locally on the PCC.

Figure 6:
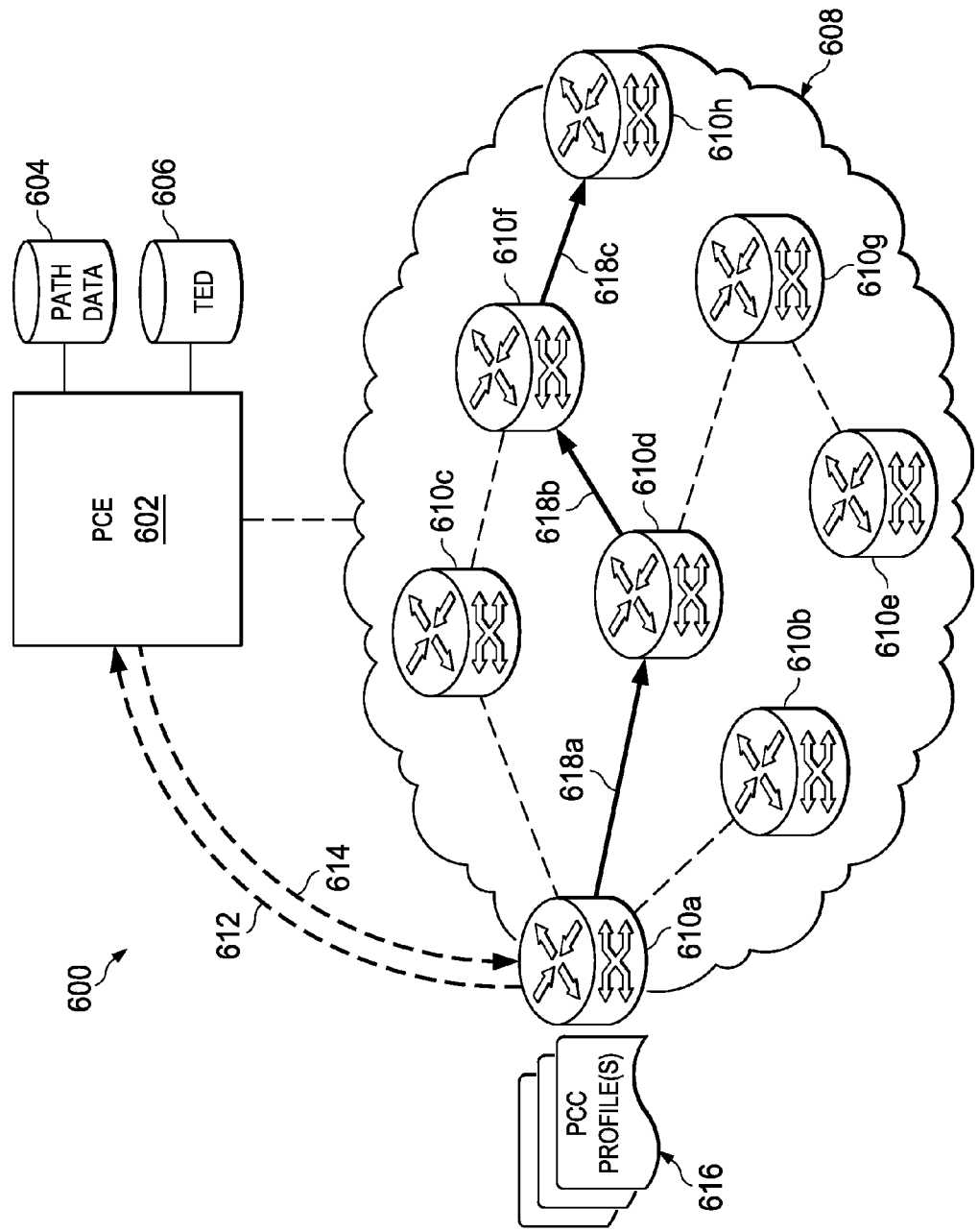
FIG. 6 is a simplified schematic diagram illustrating a system for PCE-initiated paths, according to an embodiment of the disclosure.

FIG. 6 is a simplified schematic diagram illustrating network supporting PCE-initiated paths, according to an embodiment of the disclosure. In system 600, a PCE (e.g., PCE 602) may initiate path creation. The components in system 600 (FIG. 6) are similar to the components in system 100 (FIG. 1). A key difference between systems 100 and 600 is that system 600 comprises PCC profiles 616, stored local to a PCC (e.g., router 610*a*). In one embodiment, PCC profiles 616 are implemented using the extension shown in FIGS. 2-4, and/or 22; in such a case, the PCC profiles 616 corresponds to the profile object 302. PCC profiles 616 may include PCC profile identifiers and corresponding a constraint(s) (e.g., path usage parameters), which define the profiles. For example, the constraints can define restrictions on how a path may be utilized. In this example, the PCC profiles (IDs and definitions) are stored only on the PCC and not on the PCE (PCE 602). The PCE only stores the PCC profile identifiers and not the profile definitions. The PCE may have no information regarding the constraints (e.g., the PCC profile definitions) that correspond to the profile identifier. Storage of the PCC profile definition on the PCC advantageously allows a central controller (e.g., the PCC or a SDN controller) to initiate paths, while allowing the central controller to specify (via the PCC profile) how the path may be utilized. The (distributed) PCCs enforce the constraints specified by the PCE.

Another advantage of the systems and methods described herein is that PCC profile need only be configured (or defined) once (and not more than once). After the profile is defined, PCEP messages may reference the corresponding profile id regardless of the number of paths that use that profile. Thus, the profile definition is not duplicated for each path that uses the profile. Moreover, the amount of storage space required for storing the profiles is independent of the number of paths. In contrast, if no profile and profile IDs were used, the profile definition would be explicitly specified each time a path were created therefore duplicating the profile definition multiple times (e.g., for each path) and consuming more storage space. In the latter case (without profile IDs/explicitly duplicating profiles for each path), the amount of storage space required for storing the profiles increases proportional to (e.g., increases linearly) the number of paths. In addition, the systems and methods described herein allow updating or deleting a PCC profile in one action regardless of the number of paths that are using it.

Using a PCEP extension, a PCE (e.g., PCE 602) may generate a path initiation request 614 specifying path parameters, a path destination, and a PCC profile identifier. In an embodiment, the request contains one or more PCC profile identifiers. Upon receiving the path initiation request the PCC sets up a path 618 (e.g., instantiates the path) to the path destination based on the path parameters. The PCE may send a report message 612 to the PCE indicating the status of the path 618 (e.g., up, down, properly working, not properly working). The PCE (602) may explicitly include additional path usage parameters in the path initiation request (PCRequest). These extended requests can be used to selectively augment a PCC profile. The additional path usage parameters may or may not override the PCC profile definition stored on the PCC. Note that this protocol and framework can be used with any network that uses of a path computation element that can trigger the setup of a path (e.g. Internet Protocol(IP)/MPLS networks with RSVP-TE, Segment Routing networks, etc.). While system 600 is discussed in the context of the PCE initiating a path, in some implementations, a PCC may also initiate a path. For example, a PCC may transmit a path computation request to the PCE instructing the PCE to compute a path.

Figure 7:
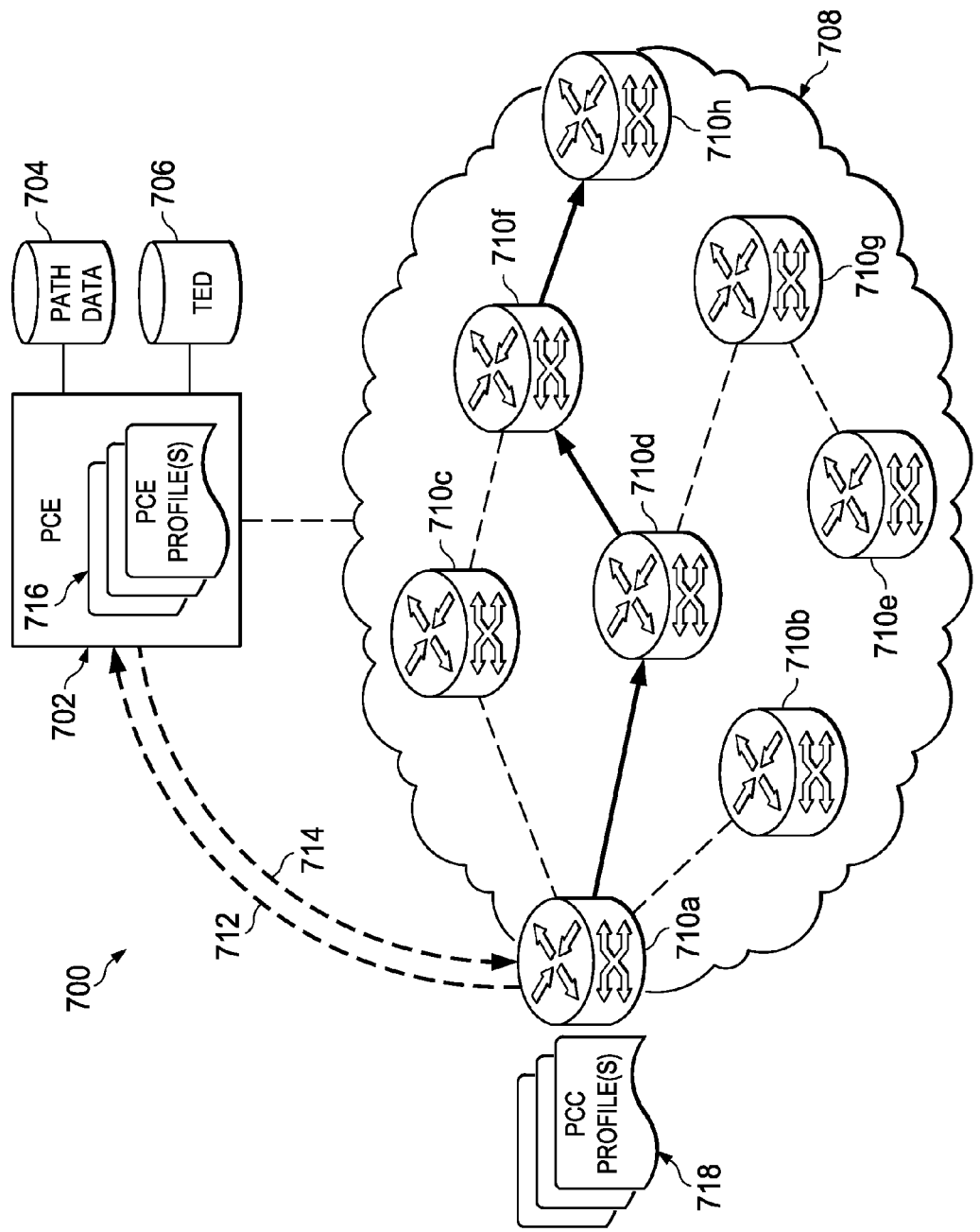
FIG. 7 is a simplified schematic diagram illustrating a system for PCC-initiated paths and PCE-initiated paths, according to an embodiment of the disclosure.

FIG. 7 is a simplified schematic diagram illustrating network supporting PCC-initiated paths and PCE-initiated paths, according to an embodiment of the disclosure. In system 700, a PCC (e.g., router 710*a*) and/or a PCE (e.g., PCE 702) may initiate path creation. The components in system 700 (FIG. 7) are similar to the components in systems 500 (FIG. 5) and 600 (FIG. 6). A key difference between systems 700, 500 and 600 is that system 700 comprises both PCE profiles 716 and PCC profiles 718, while systems 500 and 600 include one of PCE profiles and PCC profiles. In one embodiment, PCE profiles 716 and PCC profiles 718 are implemented using the extension shown in FIGS. 2-4, and/or 22; in such a case, the PCE profiles 716 and PCC profiles 718 each correspond to the profile object 302. The operation of PCE 702 and PCC 710*a* and may incorporate elements of PCE 502 and PCC 610*a*, respectively In one embodiment, the features provided for system 500 and 600 are all provided for system 700.

In each of the aforementioned systems (e.g., 500, 600, and 700), the profile identifiers are opaque identifiers, the semantics of which are determined by a system operator. The application of the opaque identifiers in computing path and/or managing path utilization provides separation (via abstraction) between PCEs and PCC thereby proving high level of flexibility with respect to implementation of the semantics of the profile identifier.

This protocol and framework may extend the application-based model in Software Defined Networking (SDN) by allowing service nodes to initiate path setup based on dynamic network service state, but without requiring any distributed path definition. It allows operators to take advantage of network intelligence (distributed service state) while minimizing operational complexity (centralized path definition and computation). Existing SDN architectures do NOT address path setup based on network services (e.g. per-Virtual Routing and Forwarding (VRF) paths, per-service-instance, per-address-family paths).

PCC-Initiated Paths

Figure 8:
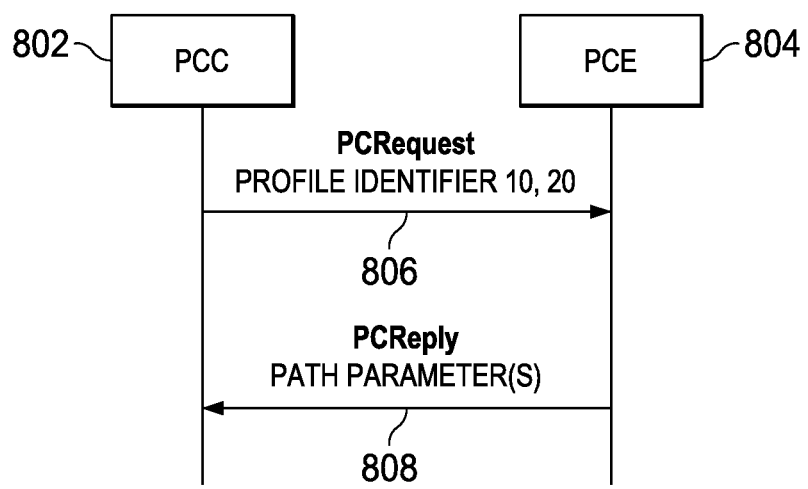
FIG. 8 is a simplified schematic diagram illustrating messages generated by a system for PCC-initiated paths, according to an embodiment of the disclosure.

FIG. 8 is a simplified schematic diagram illustrating network supporting PCC-initiated paths, according to an embodiment of the disclosure. System 800 comprises PCC 802 and PCE 804. PCC 802 transmits a path computation request message (e.g., a PCEP PCReq message) 806 to PCE 804 using an extended PCEP protocol (e.g., the extended PCEP protocol as described herein with respect to FIGS. 2-4, and/or 22). PCRequest message 806 includes profile id 10 and profile id 20 (i.e., PCE profile identifiers) each of which corresponds to at least one path constraint. PCE 804 transmits a reply message (e.g., a PCEP PCRep message) including path parameters describing a path (or an explicit path). The path complies with the path constraints that correspond to the profile id 10 and profile id 20. PCC 806 may set up a path based on the reply message.

Path constraints may comprise a policy and/or a path computation parameter. The path computation parameters may include, e.g., one or more of Explicit Route Object (ERO), bandwidth, affinities, administrative group, path characteristics (metric type, hop limit), priorities (setup/hold), symbolic name, record route, a label stack, an instance of a path template, an amount of available bandwidth, a traffic engineering metric, an Border Gateway Protocol community value, a category of tagged routes within a Border Gateway Protocol community, an Interior Gateway Protocol (IGP) metric, administrative group, and/or hop count. A policy may include one or more of a source, a destination, path computation parameter(s) in a PCEP request, time, data in a path database, data in a TED database, a requirement that two or more paths are disjoint with respect to one another. In an embodiment, a policy can be a rule that defines a relationship between any information residing on the PCE or a policy server that the PCE can access.

Figure 9:
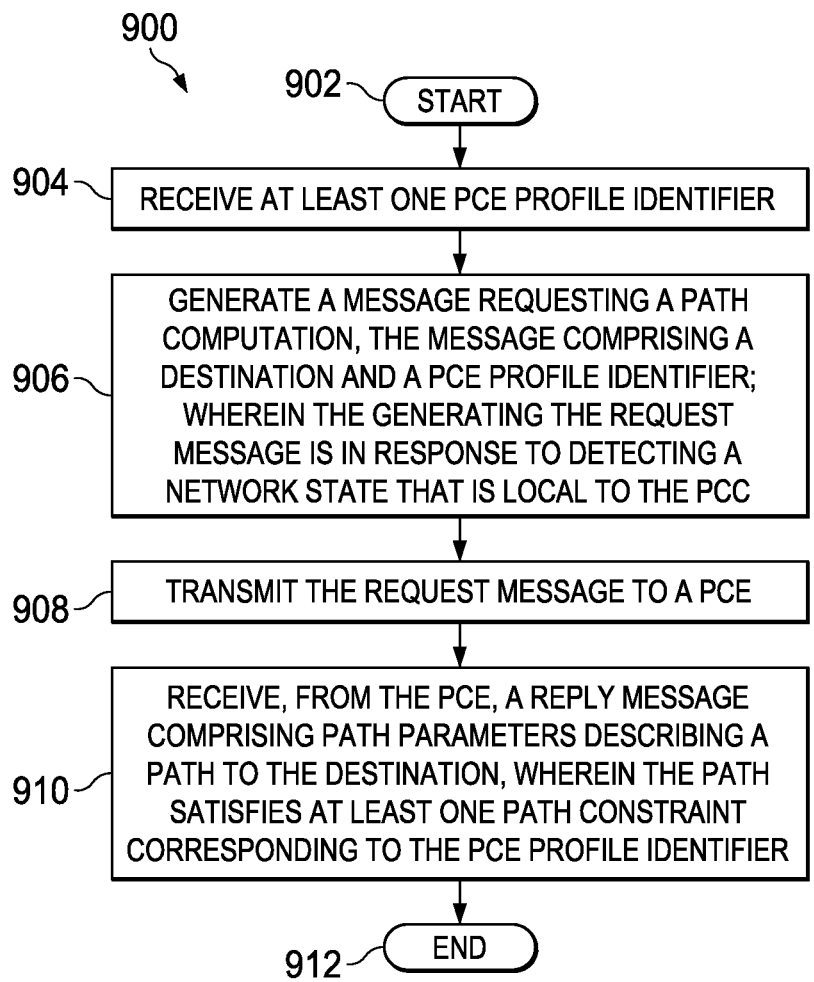
FIG. 9 illustrates exemplary logic or a method for enabling centralized path definition and policy with distributed path setup control for PCC-initiated paths, according to an embodiment of the present disclosure.

FIG. 9 illustrates exemplary logic or a method (Logic 900) for enabling centralized path definition and policy with distributed path setup control for PCC-initiated paths, according to an embodiment of the present disclosure. Logic 900 may be implemented (e.g., by a PCC) in a system where a PCC initiates paths by sending a request message to a PCE. Logic 900 comprises start point 902; receive at least one PCE profile identifier 904; generate a message requesting a path computation, the message comprising a destination identifier and a PCE profile identifier 906; transmit the request message to a PCE 908; receive, from the PCE, a reply message comprising a path to the destination, wherein the path satisfies at least one path constraint corresponding to the PCE profile identifier 910; and end point 912.

Start point 902 may coincide with a start or end point of other logic, routines, and/or applications. In addition, at start point 902, data (e.g., objects, values, variables, etc.) may be initialized, retrieved, or accessed for use in logic 900.

At procedure 904, at least one PCE profile identifier is received, e.g., by a PCC. In some embodiments, the at least one PCE profile identifier is provisioned by a profile provisioning system and/or an application that configure the definition of the profiles. Upon receipt, a PCC may store the at least one PCE profile identifier in a memory accessible by the PCC. The memory may be included in the PCC or may be external to the PCC.

At procedure 906, a message requesting a path computation (e.g., PCReq) is generated (e.g., by the PCC). The message comprises a destination identifier and a PCE profile identifier 906. In some embodiments, the message may contain a plurality of PCE profile identifiers. The message may also explicitly contain a path constraint (e.g., bandwidth) (i.e., in addition to any implicit reference to a path constraint via a PCE profile identifier).

The request message is transmitted to a PCE (e.g., by the PCC), at procedure 908. The request message may be a PCEP Request message comprising a PCE profile identifier and a destination identifier (e.g., message format as shown in FIGS. 2-4, and/or 22).

At procedure 910, a reply message (e.g., a PCEP PCRep message) comprising path parameters describing a path to the destination is received, from the PCE. The PCC may use the parameters to setup a path. In an embodiment, the path is a RSVP-TE path or a SR-TE path. The path satisfies at least one path constraint corresponding to the PCE profile identifier, which was sent, e.g., by the PCC to the PCE. If the request message included more than one PCE profile identifier or explicit path constraints, then the path (based on the data received in the reply message) may satisfy more than one path constraint corresponding to the more than one PCE profile identifier and/or the explicit path constraints. These extended requests (i.e., including explicit path constraints) can be used to selectively augment the centralized PCE profiles. The PCE may use of a path policy engine to determine if these additional parameters should be considered for a given request. Policy engine can also enforce additional path computation contains based on other information available to the PCE (e.g. path database). Advantageously, this protocol and framework can be used with any network that uses of a path computation element (PCE) and has distributed state that can trigger the setup of a path (e.g. Internet Protocol(IP)/MPLS networks with RSVP-TE, Segment Routing networks, etc.).

In some embodiments, the PCC has no information regarding the at least one path constraint corresponding to the PCE profile identifier. In other words, the parameters used by the PCE for path computation are unknown to the PCC. The PCE profile identifier provides a layer of abstraction between the definition of a PCE profile and the use of the PCE profile by distributed network components (e.g., PCCs), which may only have access to an identifier corresponding to the definition of the PCE profile and not to the definition of the PCE profile. Advantageously, because the PCE profile definition resides in a central location (e.g., at a PCE), the definition of the profile may be updated (e.g., at a PCE) in a single location, without requiring any distribution of the updated path definition to multiple locations in the network. In one example, the PCE may transmit update messages (e.g., a PCEP Update message) to specific network components (e.g., a subset of network components), which require updated path parameters and/or policy based on the updated profile.

End point 912 may coincide with a start/end point of other logic, routines, and/or applications (e.g., start point 1702, start point 1802). Logic 900 may be implemented in any component or combination of components of systems 100, 500, and/or 700. For example, a processor operatively coupled to (or within) a PCC may execute logic 900. In one implementation, logic 900 may be provisioned in whole or in part in PCC 802 (FIG. 8).

Figure 10:
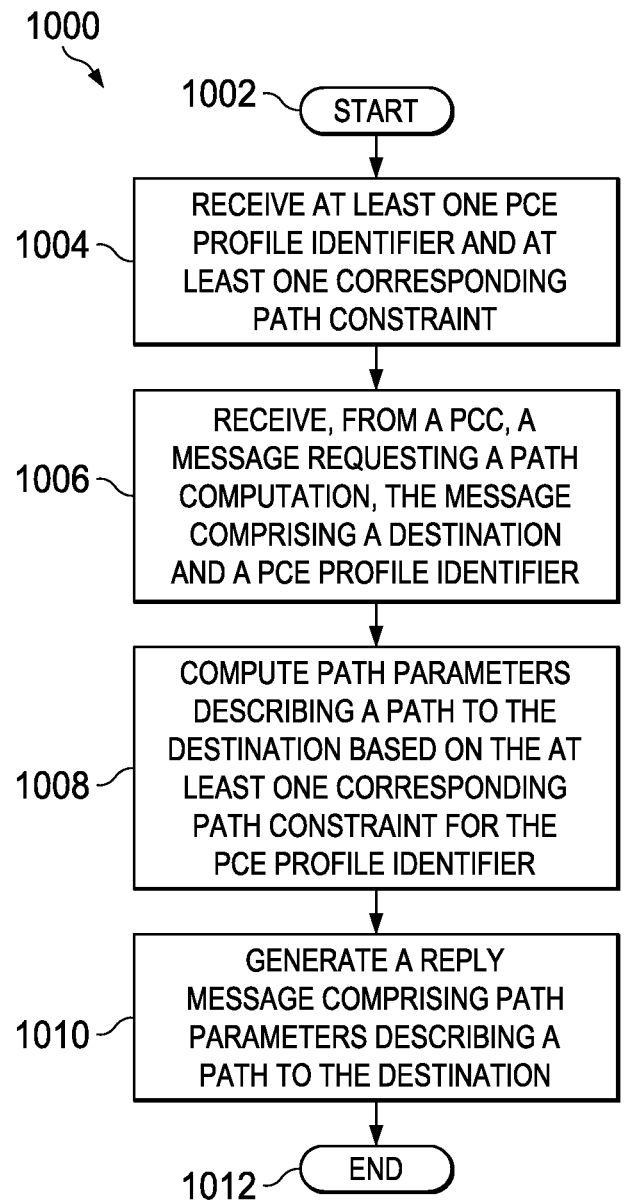
FIG. 10 illustrates exemplary logic or a method for enabling centralized path definition and policy with distributed path setup control for PCC-initiated paths, according to an embodiment of the present disclosure.

FIG. 10 illustrates exemplary logic (Logic 1000) or a method for enabling centralized path definition and policy with distributed path setup control for PCC-initiated paths, according to an embodiment of the present disclosure. Logic 1000 provides logic, which may be implemented in a system where a PCC initiates paths by sending a request message to a PCE. Logic 1000 comprises start point 1002; receive at least one PCE profile identifier and at least one corresponding path constraint 1004; receive, from a PCC, a message requesting a path computation, the message comprising a destination and a PCE profile identifier 1006; compute path parameters describing a path to the destination based on the at least one corresponding path constraint for the PCE profile identifier 1008; generate a reply message comprising the path parameters describing the path to the destination 1010; and end point 1012.

Start point 1002 may coincide with a start or end point of other logic, routines, and/or applications. In addition, at start point 1002, data (e.g., objects, values, variables, etc.) may be initialized, retrieved, or accessed for use in logic 1000.

At procedure 1004, at least one PCE profile identifier and at least one corresponding path constraint is received (e.g., by a PCE). In some embodiments, the at least one PCE profile identifier and the at least one corresponding path constraint are provisioned by a profile provisioning system and/or an application that configures the definition of the PCE profiles. Upon receipt, a PCE may store the at least one PCE profile identifier in a memory accessible by the PCE. The memory may be included in the PCE or may be external to the PCE.

A message requesting a path computation (PCReq) is received (e.g., by the PCE) from a PCC, at procedure 1006. The message comprises a destination and a PCE profile identifier. In one implementation, the message may contain one or more profile identifiers. In one example, the PCE may identify path constraints corresponding to the PCE profile identifier and/or the destination. A PCE may query a path profile database (e.g., an path database; TED database; databases 104, 106, 504, and/or 506; etc.) and apply any policies and/or path computation parameters associated with the PCE profile. The message requesting a path computation may be generated by the PCC in response to a network state that is local to the PCC. The message requesting the path computation may be an extension of a PCEP Request (PCReq) message (e.g., using the extension of PCEP as described herein with respect to FIG. 2-4 and/or 22). In an implementation, the message requesting the path computation explicitly includes one or more path constraints (e.g., in addition to the profile id and destination, the message may include a minimum latency value for the path and/or other path computation parameter, policies, etc.). The explicitly included one or more path constraints may or may augment the profile definition corresponding to the profile id. In some examples, the explicitly included one or more path constraints may or may not override the profile definition corresponding to the profile.

In some embodiments, PCE has no information regarding the network state that is local to the PCC. In other words, there exists a network state local to the PCC that is not accessible the PCE, or is too costly to access. Thus, the PCC may make a decision, based on a state local to the PCC, to request path generation without prompting by the PCE.

At procedure 1008, path parameters (or path description parameters) describing a path to the destination is computed (e.g., by the PCE) based on the at least one corresponding path constraint for the PCE profile identifier. A reply message (e.g., a PCEP PCRep message) comprising the path parameters for the path is generated (e.g., by the PCE) at procedure 1010. In one example, the reply message is a PCEP path computation reply message that is transmitted from a PCE to a PCC. The PCC may use the parameters to setup a path. In an embodiment, the path is a RSVP-TE path or a SR-TE path.

A path constraint may comprise a policy and/or a path computation parameter. A path computation parameter may include, e.g., one or more of Explicit Route Object (ERO), bandwidth, affinities, administrative group, path characteristics (metric type, hop limit), priorities (setup/hold), symbolic name, record route, a label stack, an instance of a path template, an amount of available bandwidth, a traffic engineering metric, an Border Gateway Protocol community value, a category of tagged routes within a Border Gateway Protocol community, an Interior Gateway Protocol (IGP) metric, administrative group, and/or hop count. A policy may include one or more of a source, a destination, a path computation parameter in a PCEP request, time, data in a path database, data in a TED database, a requirement that two or more paths are disjoint with respect to one another.

End point 1012 may coincide with a start/end point of other logic, routines, and/or applications (e.g., start point 1702, start point 1802). Logic 1000 may be implemented in any component or combination of components of systems 100, 500, and/or 700. A processor operatively coupled to (or within) a PCE may execute logic 1000. In one implementation, logic 1000 may be provisioned in whole or in part in PCE 803 (FIG. 8).

FIG. 11 is a table illustrating exemplary definitions for PCE profiles, according to an embodiment of the present disclosure. The first column lists the PCE profile identifiers and the second column corresponds to the definition of the PCE profiles. Each PCE profile identifier may correspond to at least one policy and/or path constrain. In this example, each PCE profile identifier corresponds to more than one least one policy and/or path constrain. The PCC profile identifiers in FIG. 11 may also correspond to a single policy and/or path constrain (though not shown). At least a portion of the data illustrated in the table may be stored in a memory for access by a PCE and/or a PCE.

Example Applications of PCC Initiated Paths

A first example application includes automatic tunnel mesh driven by network services. Assume a network with 100 Provider Edge (PE) devices that provide public IP, private IP and private multi-point Ethernet (E-LAN) services. Each of these services has unique traffic engineering requirements, so separate meshes of TE (RSVP-TE or Segment Routing) paths need to be created for specific service prefixes between service end points. Each PE can use a given BGP community value when advertising prefixes of interest for a particular service:

IPv4<->Community-value1
VPNv4<->Community-value2
VPLS<->Community-value3

Figure 12A:
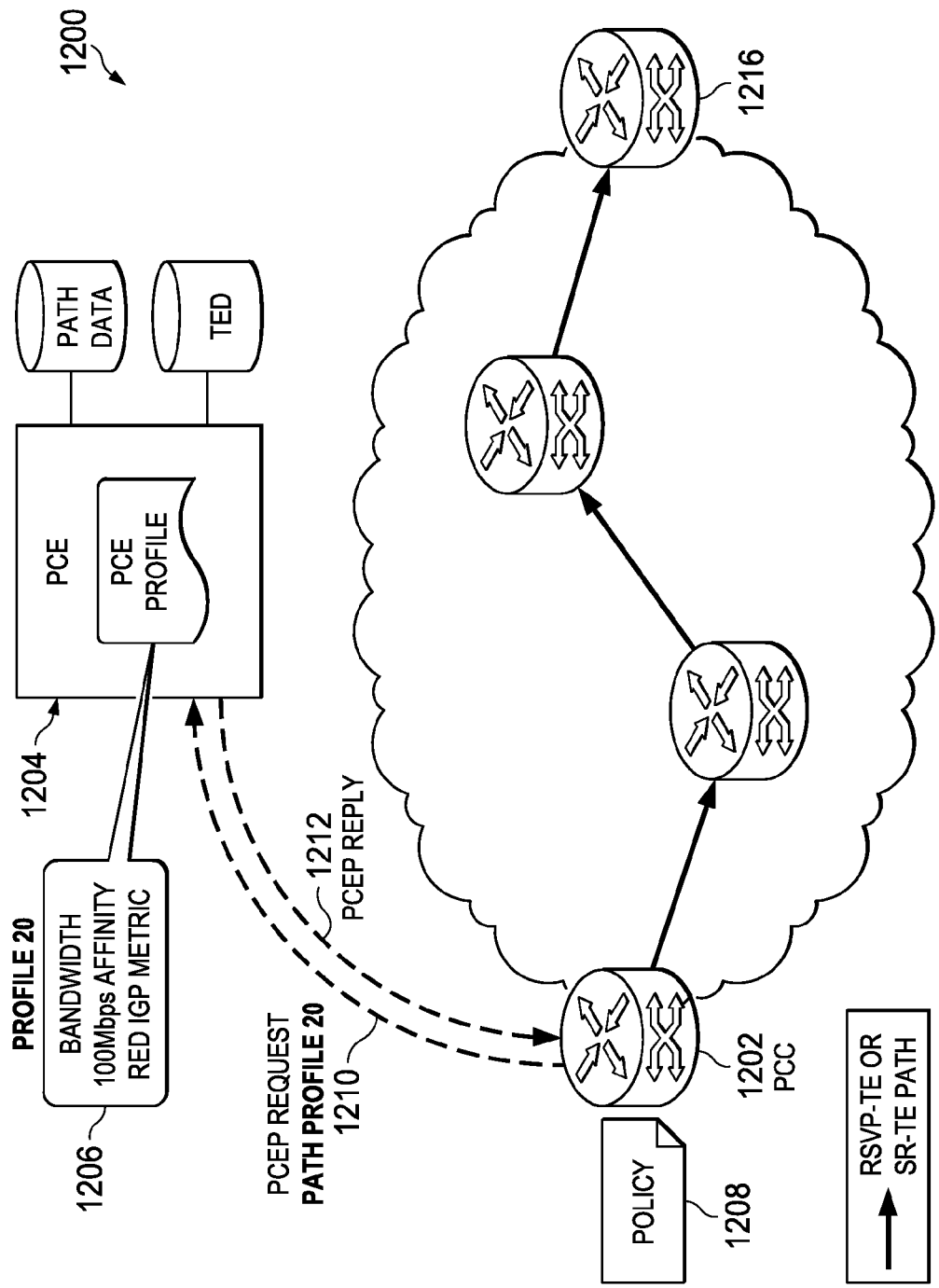
FIGS. 12A and 12B are simplified schematic diagrams illustrating an exemplary system and workflow for enabling generating a path based on a policy local to a PCC, according to an embodiment of the present disclosure.
Figure 12B:
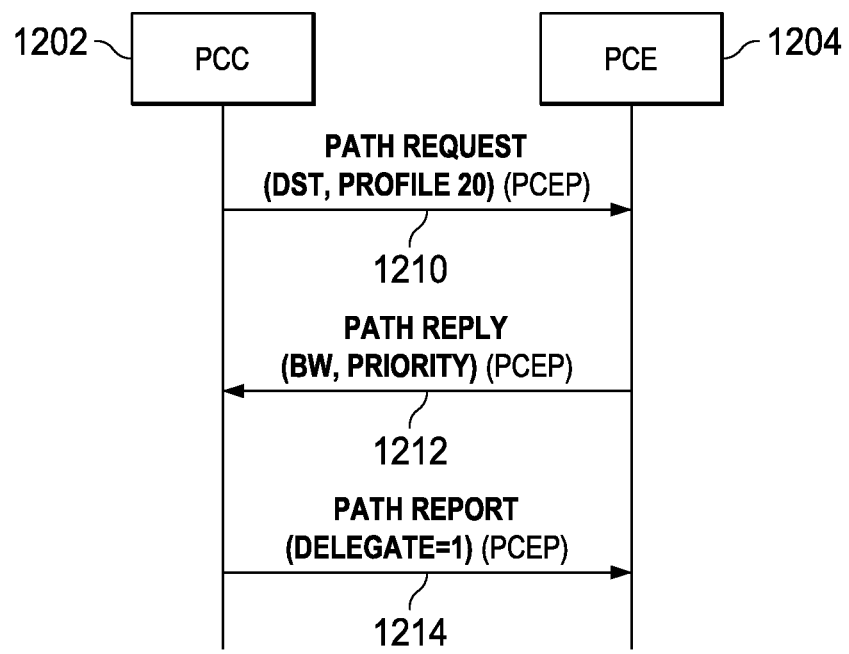

For example, FIGS. 12A and 12B are simplified schematic diagrams illustrating an exemplary system and workflow for enabling generating a path based on a policy local to a PCC, according to an embodiment of the present disclosure. Each community corresponds to a path profile, as defined by local policy 1208. An ingress PE 1202 receives the advertisement and checks whether a path has been established to the egress PE 1216 with the required path profile. If not, it transmits a path computation request 1210 to PCE 1204 asking for a path to the egress PE 1216 for the profile 1206 identified in the local policy 1208 for the community. Once a path computation reply 1212 is received, the path is setup (e.g., established, generated, or signaled (only signaled if RSVP-TE is required), etc.) and the service prefixes are associated with the received path. In one example, the path is a RSVP-TE path or a SR-TE path. The PCC may transmit a report to the PCE (e.g., using PCEP to delegate control). Note that an operator of system 1200 may allow customers or peers to dynamically signal service prefixes that require paths of certain profiles, e.g., using BGP communities over an eBGP peering with the network.

Note that in the first example application, if a distributed path definition approach is used, each PE ends up with 99×3=297 path (tunnel) definitions for a total of 29,700 network wide. If distributed path profiles (tunnel templates) are used, each PE ends up with 3 locally defined profiles, which are replicated across all PEs (300 profile definitions in the network). With centralized profiles, the PCE only maintains a single copy of the 3 path profiles.

A second example application includes distributed denial of service (DDoS) protection using BGP Flowspec and path profiles. A BGP Flowspec rule can be injected at an egress LSR with a specific community. When ingress LSRs receives the Flowspec entry, it is processed as usual and the community value is used to identify a path profile. A path computation request is placed to a PCE indicating the path profile and the destination desired (whether redirection is need or not). No BGP Flowspec extensions are required. Once a path computation reply is received the path is setup (e.g., generated, instantiated, signaled if RSVP-TE is required, etc.) and the traffic matching the Flowspec is injected in the received path.

Figure 13A:
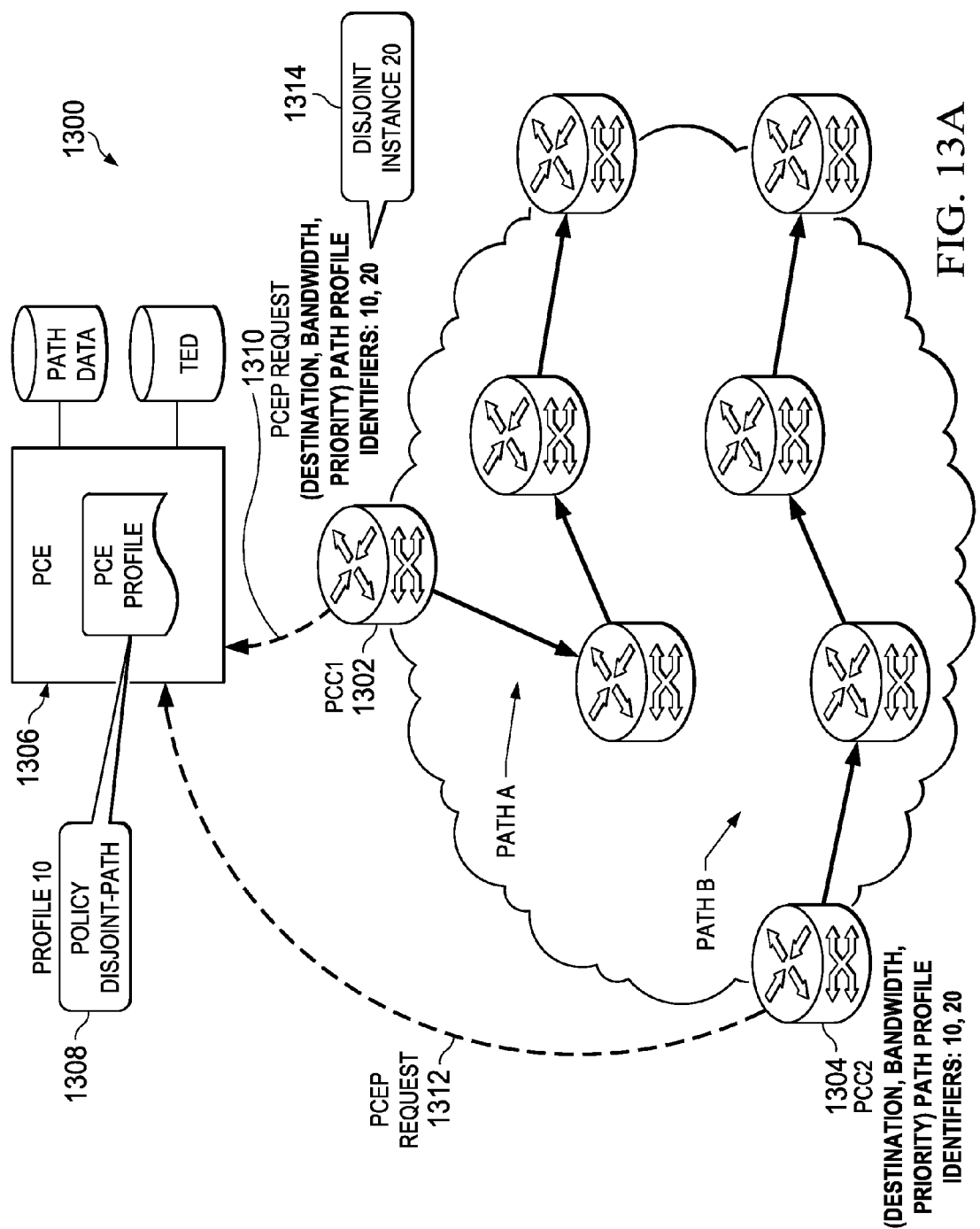
FIGS. 13A and 13B are simplified schematic diagrams illustrating an exemplary system and workflow for establishing fully disjoint paths, according to an embodiment of the present disclosure.
Figure 13B:
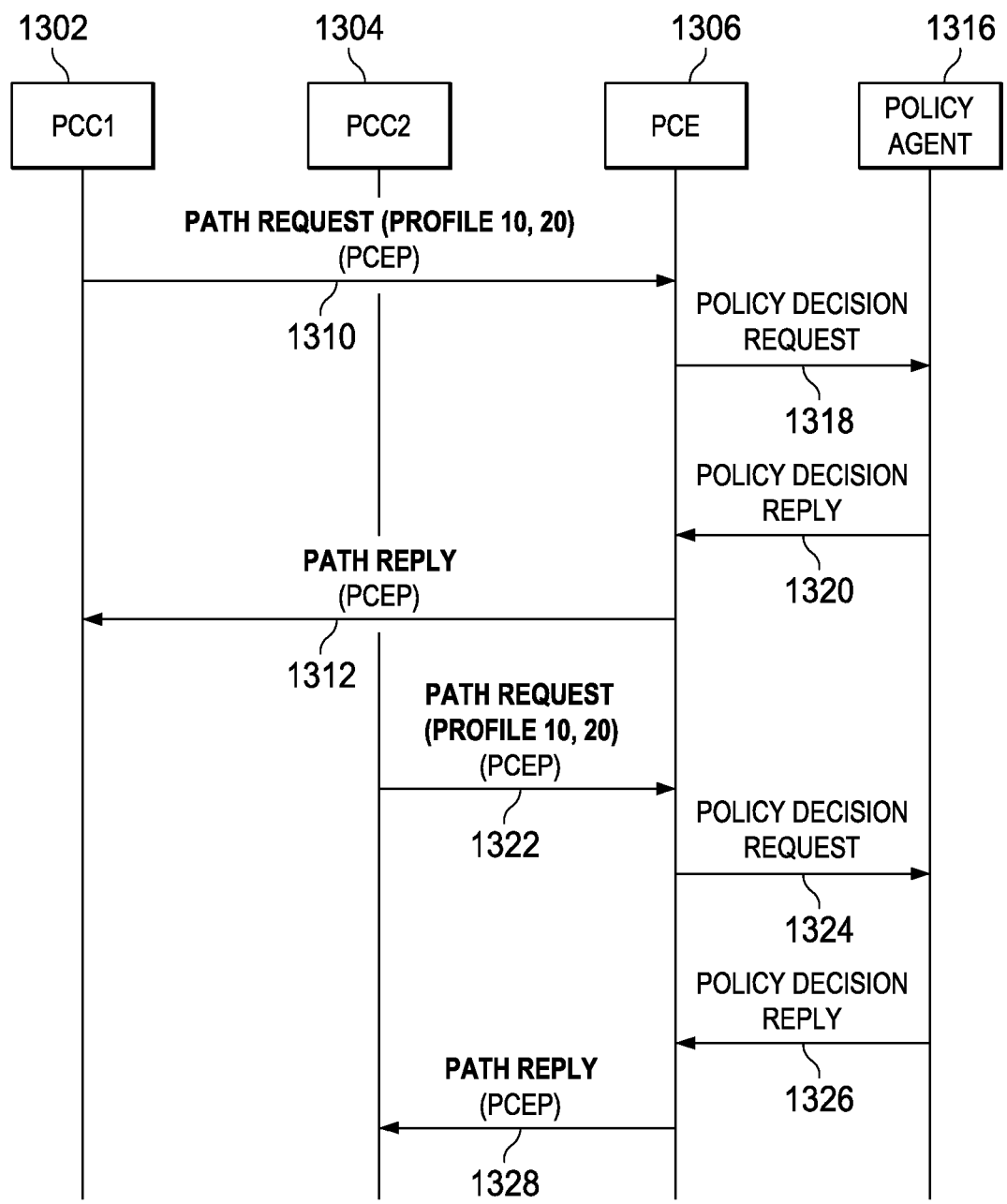

A third example application includes generating fully disjoint paths (e.g., TE LSPs and/or SR-TE paths). For example, FIGS. 13A and 13B are simplified schematic diagrams illustrating network architecture a workflow for establishing fully disjoint paths, according to an embodiment of the present disclosure. System 1300, as illustrated in FIGS. 13A and B, includes two PCCs (i.e., PCC1, 1302 and PCC2, 1304), which independently submit path computation requests to the PCE 1306 for disjoint paths. First, PCC1 1302 submits to the PCE, path computation request 1310, which includes profile IDs 10 and 20 (i.e., 1308 and 1314, in FIG. 13A) and a destination. The path computation request may also explicitly include additional path constraints (e.g., bandwidth, and priority). In this example, profile ID 10 corresponds to a policy of disjointness between paths, and profile ID 20 corresponds to a service instance (e.g., an instance of the disjointness policy associated with a particular network service). One profile ID (in this case 20) may be used as a parameter (or argument value) associated with another profile ID (in this case 10). In this example, profile ID 20 (e.g., the parameter) is interpreted by PCE 1306 within the context of 10. In addition, a path (e.g., Path A) returned from PCE 1306 to request 1310 may also satisfy the additional path constraints (e.g., for bandwidth and priority based on those included in request 1310). Later, PCC2 1304 submits to the PCE, path computation request 1322 also specifying profiles 10 and 20. Path computation request 1322 also explicitly includes additional path constraints (e.g., bandwidth, and priority). In this example, since both requests correspond to the same disjoint instance (i.e., 20), the path computed for PCC2 must be disjoint from all existing paths for disjoint instance 20 (i.e., must be disjoint from Path A). The PCE may know about the existence of Path A based on a database entry associated with Path A. PCE 1306 generates a path (i.e., Path B), and transmit the path to PCC2 1304 in a PCEP reply message. In addition to Path B being disjoint from Path A, Path B may also satisfy the additional path constraints (e.g., for bandwidth and priority based on those included in request 1312). Note that the bandwidth and priority included in request 1312 may be different from the bandwidth and priority included in request 1310.

The PCCs may not know about one another and may not know whether any paths exist for the requested profiles (i.e., policies). To resolve each request, the PCE 1306 may communicate with policy agent 1316 (e.g., sending messages 1318 and 1324 to the police agent) to determine whether the PCC's requests satisfy the policy. The application of the policy, by policy agent 1316, may return a Boolean value indicating whether an action is allowed given a current state of the network (e.g., by sending messages 1320 and 1326 to the PCE). In the example of a disjoint policy, the Boolean value indicates whether a path may be initiated (i.e., action) in the network that does not overlap with an existing path (i.e., current state) in the network. The PCEP messages (e.g., 1310, 1312, 1322, and 1328) may be generated using an extension of a PCEP (e.g., using the extension of PCEP as described herein with respect to FIGS. 2-4, and/or 22).

In this case, the PCE is a stateful PCE storing state information for existing paths that were generated by the PCE. For example the PCE may maintain a database of existing paths in the network. The state information can include paths and corresponding profile identifiers associated with the paths. For example, a path that was generated based on profile identifier 10, would be stored in the database with an association to profile identifier 10.

Whenever a network service requires fully disjoint paths, LSP head ends (acting as Path Computation Clients (PCCs)) can use one or more of the profile IDs (e.g., in this case profile id 20) as a service identifier that a stateful PCE can use to enforce a policy of full disjointness between paths associated with the id. This is approach to achieving disjoint paths with stateful PCE while letting PCCs initiate path setup may be advantageously applied to transport of signaling traffic (e.g., signaling transport (SIGTRAN)) and transport of market data in financial markets. Other mechanisms fail to achieve disjoint paths with stateful PCE while allowing PCCs initiate path setup.

Policies are not limited to disjoint policies. A policy may include one or more of the following: source address, destination address, path computation parameters in a PCEP request, time, data in a database containing path information, data in a path database, data in a TED database, or any other information available locally or remotely to the PCE. Policies may use an array of parameters as input. In some embodiments, the PCE may act as a policy enforcement point (PEP). The PCE may use a profile id to identify a policy enhancing path computation.

A fourth example application includes handling changes to centralized path computation via policy advantageously through the systems and methods described herein. For an active stateful PCE (e.g., Software Defined Network (SDN) model), the PE devices delegate control to the PCE. Therefore, changes made to path definition and policy can be immediately acted upon by the PCE and communicated to PE devices using a PCEP PCUpd message (i.e., an update message). In the case of a stateless PCE or passive stateful PCE, the changes will take effect on the PE devices during the next computation request. Reoptimization timers, topology changes, or operator action can trigger the changes.

PCE-Initiated Paths

Figure 14:
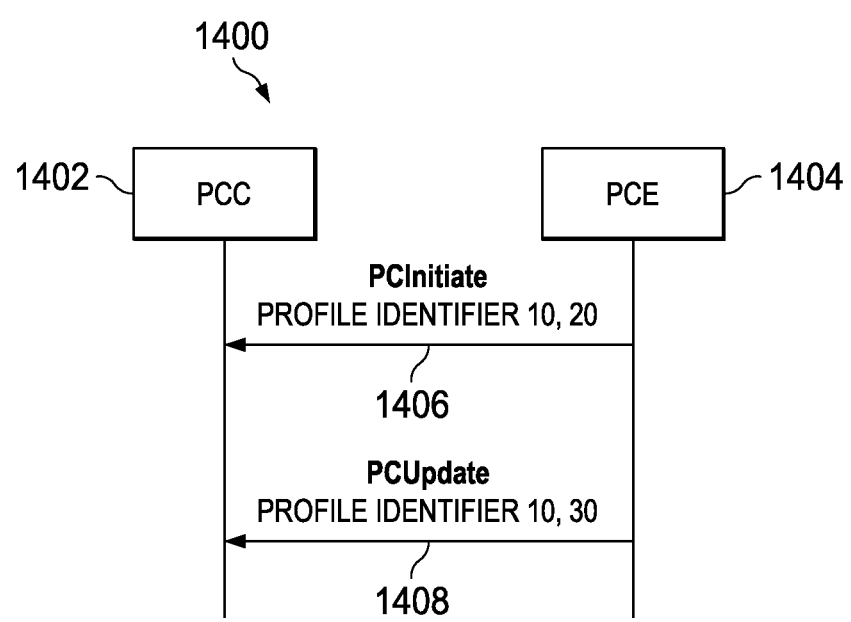
FIG. 14 is a simplified schematic diagram illustrating messages generated by a system for PCE-initiated paths, according to an embodiment of the disclosure.

FIG. 14 is a simplified schematic diagram illustrating network supporting PCE-initiated paths, according to an embodiment of the disclosure. System 1400 comprises PCC 1402 to PCE 1404. PCE 1404 transmits PCInitiate message 1406 to PCC 1402. PCInitiate message 1406 includes profile id 10 and profile id 20 (i.e., PCC profile identifiers) each of which corresponds to a path usage parameter. The PCC may set up a path based on the PCInitiate. All utilization of the path must satisfy the path usage parameter specified in the PC initiate message. Subsequent to the initiate message the PCE transmits an update message (e.g., a PCEP PCUpd message) 1408 to the PCC to communicate updated profiles to the PCC (e.g., profiles corresponding to a path). A path update message may include at least one of an updated path parameter describing the path from the PCC to the path destination (e.g., if the path it self has changed) and/or an updated profile identifier (e.g., if the usage parameters for a path(s) has changed). Based on the updated profiles, any subsequent utilization of the path must satisfy the updated path usage parameters corresponding to the updated profiles.

In an implementation, each of the PCInitiate message and the update message may comprise a profile object and/or one or more profile IDs (e.g., using the extension of PCEP as described herein with respect to FIGS. 2-4, and/or 22).

A path usage parameter may comprise one or more of a auto-bandwidth, a backup bandwidth, Bidirectional Forwarding Detection (BFD), forwarding adjacency, load share, event logging, a quality of service (QoS) policy, an IGP shortcut, an instruction specifying that the path should be used in a shortest path calculation, requiring use of a targeted Label Distribution Protocol, requiring use of a Bidirectional Forwarding Detection protocol, a local variable on the router indicating a coloring of a tunnel for forwarding, automatic bandwidth collection, automatic bandwidth adjustment, length of a window of time in which the average traffic going over the tunnel is computed, traffic accounting parameter, IP address, a maximum transmission unit, a policing function, etc.

Figure 15:
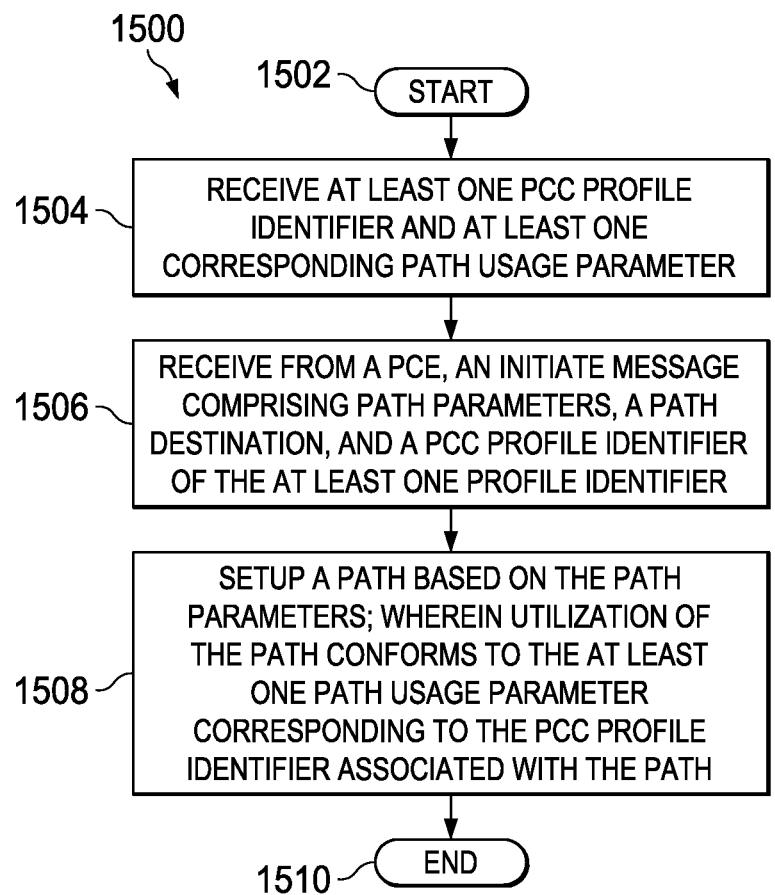
FIG. 15 illustrates exemplary logic or a method for enabling centralized path setup control with distributed path utilization constraints for PCE-initiated paths, according to an embodiment of the present disclosure.

FIG. 15 illustrates exemplary logic or a method (Logic 1500) for centralized path setup control with distributed path utilization constraints for PCE-initiated paths, according to an embodiment of the present disclosure. Logic 1500 may be implemented in a system where a PCE initiates paths by sending a path initiation message to a PCC. Logic 1500 comprises start point 1502; receive at least one PCC profile identifier and at least one corresponding path usage parameter 1504; receive, from a PCE, an initiate message comprising path parameters, a path destination, and a PCC profile identifier 1506; setup a path based on the path parameters, wherein utilization of the path conforms to the at least one past usage parameter corresponding to the profile identifier associated with the path 1508; and end point 1510.

Start point 1502 may coincide with a start or end point of other logic, routines, and/or applications. In addition, at start point 1502, data (e.g., objects, values, variables, etc.) may be initialized, retrieved, or accessed for use in logic 1500.

At procedure 1504 at least one PCC profile identifier and at least one corresponding path usage parameter is received (e.g., by a PCC). In some embodiments, the at least one PCC profile identifier and the at least one corresponding path usage parameter is provisioned by a profile provisioning system and/or an application that configures the definition of the profiles. Upon receipt, a PCC may store the at least one PCC profile identifier and the at least one corresponding path usage parameter in a memory accessible by the PCC. The memory may be included in the PCC or may be external to the PCC.

At procedure 1506, an initiate message comprising path parameters, a path destination, and a PCC profile identifier is received (e.g., by a PCC) from a PCE. In some embodiments, the initiate message may include one or more PCC profile identifiers and/or one or more explicitly stated path usage parameters. The initiate message may be an extension of a PCEP PCInitiate message (e.g., using the extension of PCEP as described herein with respect to FIGS. 2-4, and/or 22).

At procedure 1508, a path is setup (e.g., established or instantiated) (e.g., by a PCC) based on the path parameters. Utilization of the path conforms to the at least one past usage parameter corresponding to the PCC profile identifier associated with the path. In one example, a PCC (e.g., the PCC that setup the path) may enforce the utilization of the path to satisfy the at least one past usage parameter. For example the PCC may block or reroute any traffic on the path that does not satisfy the at least one past usage parameter. In addition, if the initiate message included any additional PCC profile identifier and/or an explicit reference to a path usage parameter, the utilization of the path also conforms to at least one past usage parameter corresponding to the additional PCC profile identifier and/or the explicitly referenced path usage parameter.

End point 1510 may coincide with a start/end point of other logic, routines, and/or applications (e.g., start point 902, start point 1002). Logic 1500 may be implemented in any component or combination of components of systems 100, 600, and/or 700. A processor operatively coupled to (or within) a PCE may execute logic 1500. In one implementation, logic 1000 may be provisioned in whole or in part in PCC 1402 (FIG. 14).

Figure 16:
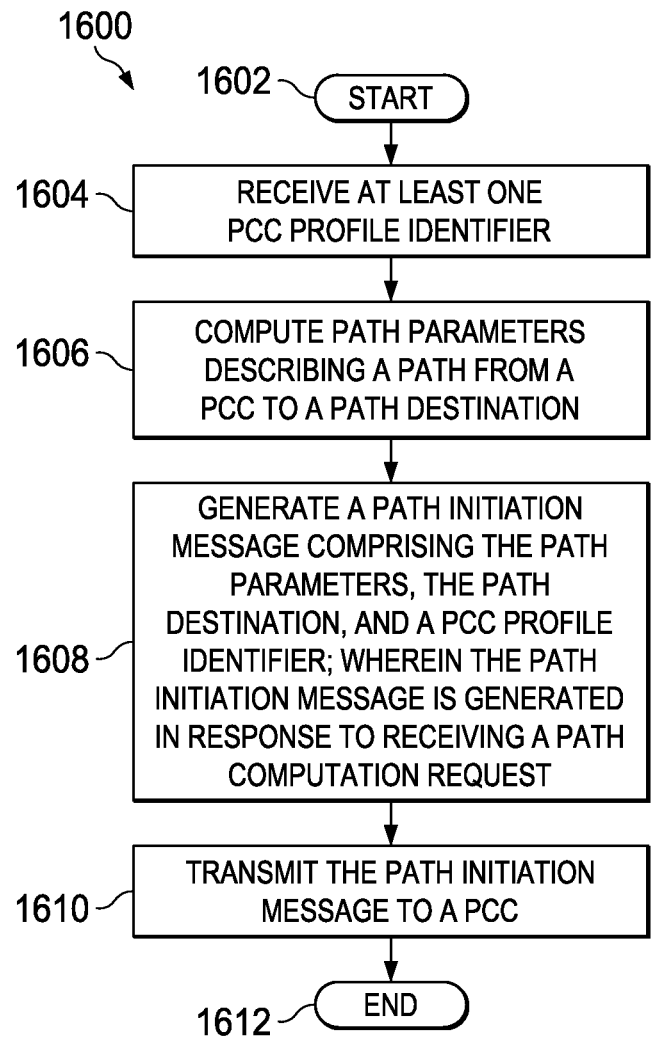
FIG. 16 illustrates exemplary logic or a method for enabling centralized path setup control with distributed path utilization constraints for PCE-initiated paths, according to an embodiment of the present disclosure.

FIG. 16 illustrates exemplary logic or a method (Logic 1600) for enabling centralized path setup control with distributed path utilization constraints for PCE-initiated paths, according to an embodiment of the present disclosure. Logic 1600 may be implemented in a system where a PCE initiates paths by sending a path initiation message to a PCC. Logic 1600 comprises start point 1602; receive at least one PCC profile identifier 1604; compute path parameters describing a pass from a PCC to a path destination 1606; generate a path initiation message comprising the path parameters, the path destination, and a PCC profile identifier, wherein the path initiation message is generated in response to receiving a path computation request 1608; transmit the past initiation message to the PCC 1610; and end point 1612.

Start point 1602 may coincide with a start or end point of other logic, routines, and/or applications. In addition, at start point 1602, data (e.g., objects, values, variables, etc.) may be initialized, retrieved, or accessed for use in logic 1600.

Procedure 1604, at least one PCC profile identifier is received, e.g., by a PCE. In some embodiments, the at least one PCC profile identifier is provisioned by a profile provisioning system and/or an application that configures the definition of the profiles. Upon receipt, a PCE may store the at least one PCC profile identifier in a memory accessible by the PCE. The memory may be included in the PCE or may be external to the PCE.

At procedure 1606, path parameters describing a path from a PCC to a path destination are computed (e.g., by a PCE).

A path initiation message is generated (e.g., by a PCE) at procedure 1608. The path initiation message comprises the path parameters, the path destination, and a PCC profile identifier. In some examples, the path initiation message contains one or more PCC profile identifiers. In addition, the path initiation message is generated in response to receiving a path computation request. In an embodiment, the path computation request is not received from a router acting as a PCC. The path computation request may be received from an object local to the PCE (e.g., within the PCE) or may be received remotely from an external component (e.g., an application). For example, path computation request may be received from an application that uses an interface of a controller (e.g., a northbound interface of an SDN controller) to instruct the PCE to create a path in the network. The path initiation message is transmitted to a PCC at procedure 1610. In an embodiment, the initiate message may be an extension of a PCEP PCInitiate message (e.g., using the extension of PCEP as described herein with respect to FIGS. 2-4, and/or 22).

End point 1612 may coincide with a start/end point of other logic, routines, and/or applications (e.g., start point 902, start point 1002). Logic 1600 may be implemented in any component or combination of components of systems 100, 600, and/or 700. A processor operatively coupled to (or within) a PCE may execute logic 1600. In one implementation, logic 1000 may be provisioned in whole or in part in PCE 1404 (FIG. 14).

Example Applications of PCE-Initiated Paths

Figure 17A:
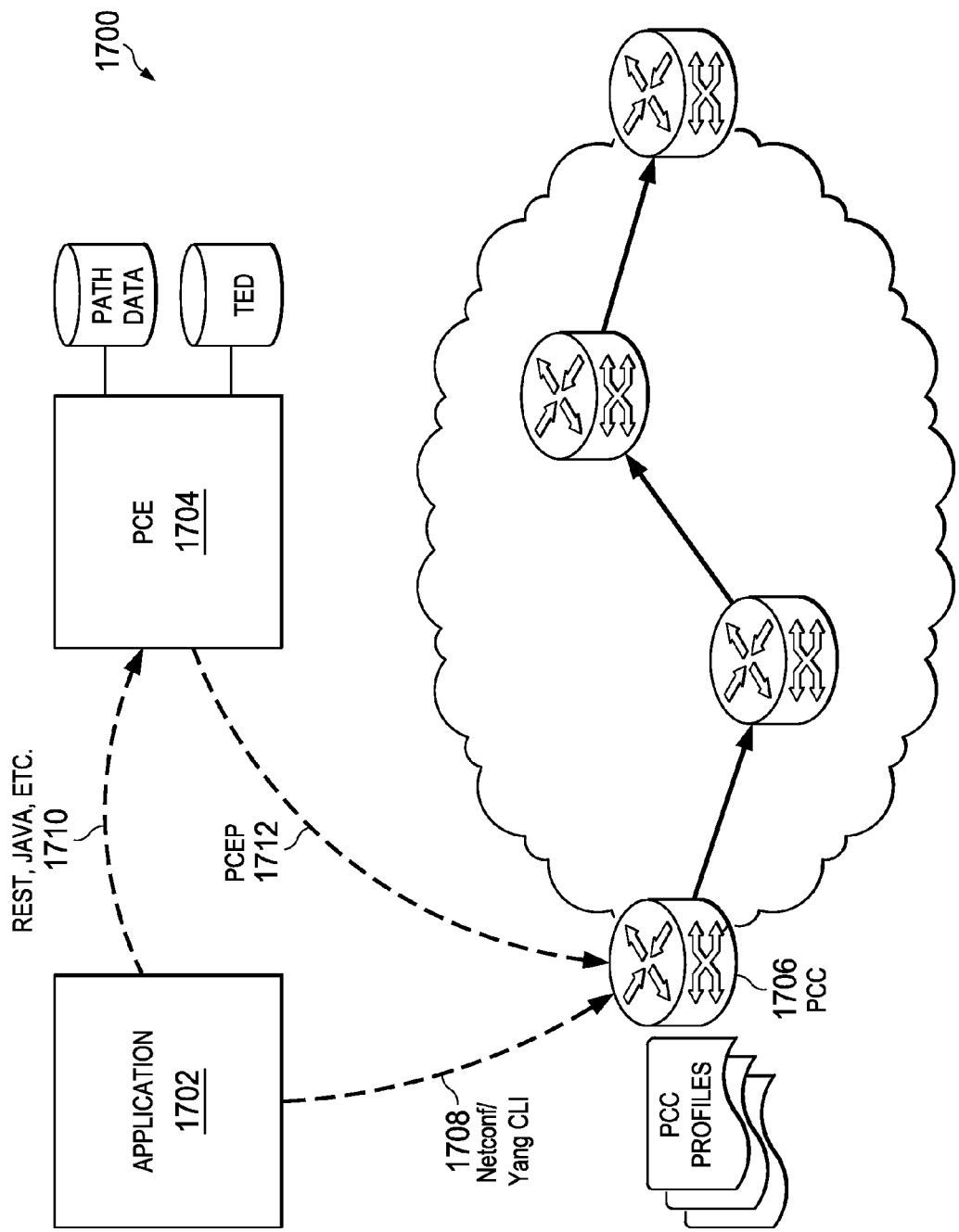
FIGS. 17A and 17B are simplified schematic diagrams illustrating an exemplary system and workflow for implementing a network service, according to an embodiment of the present disclosure.
Figure 17B:
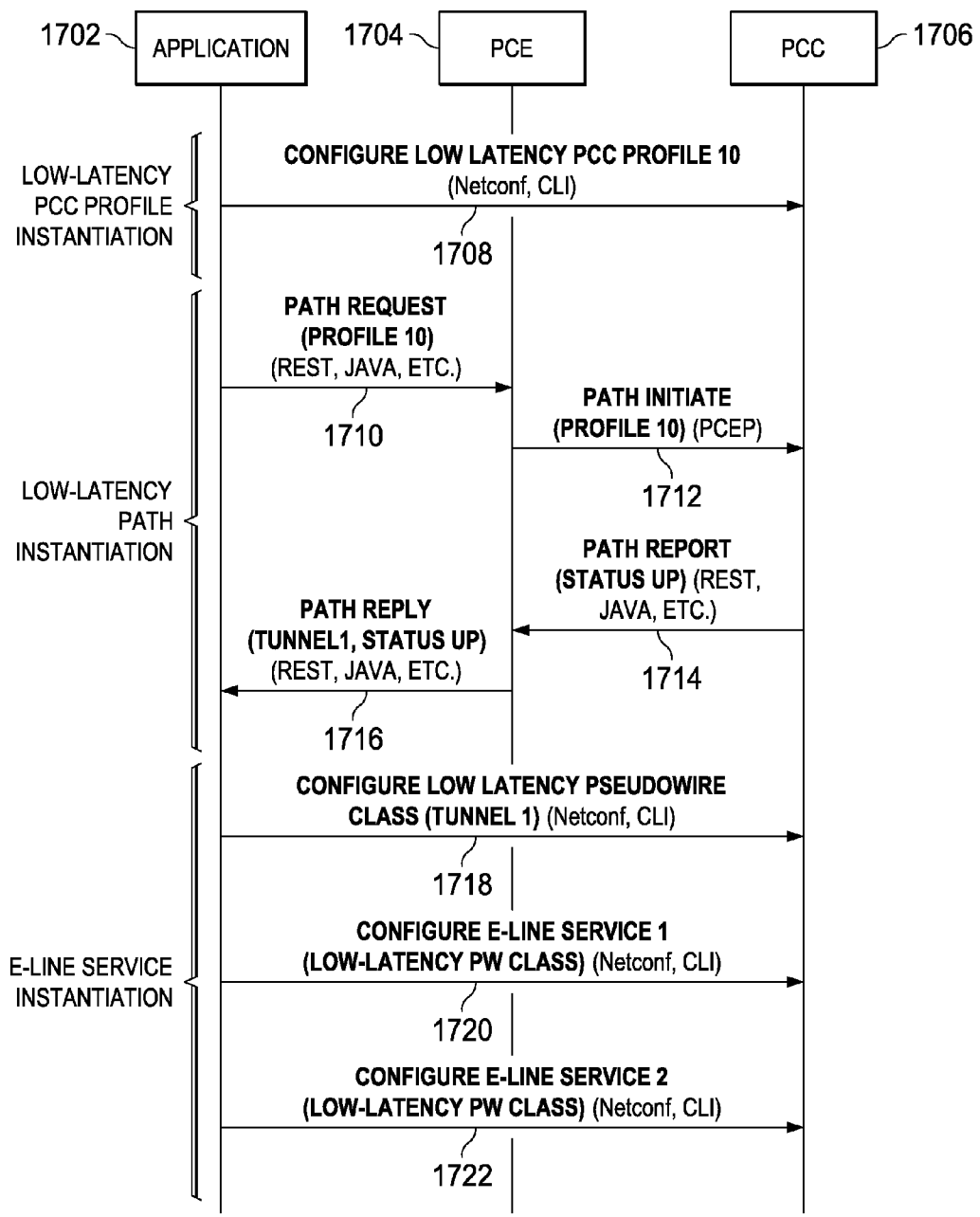

FIGS. 17A and 17B are simplified schematic diagrams illustrating an exemplary system and workflow for implementing a network service, according to an embodiment of the present disclosure. System 1700 comprises elements similar to those in system 600. A key difference from system 600 is that system 1700 includes application 1702, which manages PCC profile instantiation, path instantiation, and service instantiation for an Ethernet Private Line (E-LINE) service. Although the application 1702 manages initiation of the paths, profiles, and services, the PCE performs the initiations (e.g., based on a requests received from of the application). As shown in FIG. 17B, Application 1702 manages PCC profile instantiation, path instantiation, and service instantiation. The application 1702 transmits, to PCC 1706, configuration message 1708 providing a PCC profile identifier and a definition of the PCC profile. The definition of the PCC profile may include at least one path usage parameter corresponding to the PCC profile identifier. PCC 1706 may store the PCC profile in a memory element accessible by the PCC. The configuration message may be a transmitted via Network Configuration Protocol (Netconf), YANG data model, and/or a command line interface (CLI). To manage path instantiation, the application 1702 transmits to the PCE, path request message 1710, which specifies PCC profile identifier 10. In some implementation, path request message 1710 may comprise one or more PCC profile identifiers. The path request message may be transmitted utilizing a HTTP GET, a representational state transfer (REST) call, a Java message, etc. In response to receiving path request message 1710, PCE 1704 may transmit to PCC 1706 a path initiation request 1712 including the PCC profile identifier(s) received from application 1702. Path initiation request 1712 may be a PCEP message (e.g., an extended PCEP message as in FIGS. 2-4, and/or 22). In response to receiving the path initiation request, the PCC may setup the path (e.g., establish or instantiate the path). In some embodiment, upon setting up the path, PCC 1706 may store an association between the profile ID and the path. PCC 1706 may ensure that any use of the path satisfies the path usage parameters that correspond to the profile ID associated with the path. PCC 1706 transmits to PCE 1704 path report message 1714 including a status of the path setup by the PCE. In response to receiving the path report message, PCE 1704 transmits to the application 1702 path reply message 1716 including an identifier for the path and the status of the path.

To manage service instantiation, the application 1702 transmits to PCC 1706 a service configuration message 1718 including the identifier for the path. In response, the PCC may generate a service class using the identifier for the path based on the configuration request received from the application. Finally, the application 1702 transmits to the PCC, instantiation requests 1720 and 1722. In response instantiation requests, the PCC generates services based on the previously defined service class.

FIGS. 18A and 18B are tables illustrating exemplary definitions for PCC profiles, according to one or more embodiments of the present disclosure. In both tables, the first column (i.e., column labeled "PCC PROFILE IDENTIFIER") lists PCC profile identifiers and the second column (i.e., column labeled "PROFILE DEFINITION") corresponds to the definition of the PCC profiles using one or more path usage parameters. In FIG. 18A, each PCC profile identifier corresponds to only one path usage parameter, which defines the profile. In FIG. 18B, each PCC profile identifier corresponds to more than one path usage parameter. The PCC profile identifiers in FIG. 18B may also correspond to a single path usage parameter (though not shown). Each PCE profile identifier may correspond to at least one path usage parameter. Advantageously, the choice of whether to associate profile IDs with a single path usage parameter or a plurality of usage constraints allows a network operator flexibility of predefining specific combinations of path usage parameters (FIG. 18A) or allowing maximum flexibility to mix and match various path usage parameters, as needed (FIG. 18B). At least a portion of the data illustrated in the table may be stored in a memory for access by a PCE and/or a PCE.

Other Example Applications

Several embodiments of the present disclosure relate to using profile identifiers that correspond to a profile definition, which can be defined by an attribute and a value of the attribute (e.g., attribute: Bandwidth; value: 100 Mbps). In other embodiments, the profile identifiers can correspond to a profile definition that is only partially defined. For example, a partially defined profile may include an attribute (e.g., a constraint, a path usage parameter, a policy, a path computation parameter) but may not include a specific value of the attribute. Any device or component that utilizes the profile identifier of the profile, must provide the value (e.g., a parameter or argument value) as an input to the attribute or constraint. An exemplary use of such a profile includes, e.g., systems where a range of values or a large set of specific values is acceptable for an attribute. The following table provide non-limiting examples of partially defined profiles:

| PCC Profile | PCE Profile |
|---|---|
| Profile 10: BFD interval <A>, multiplier <B> | Profile 50: Bandwidth <A> |
| Profile 20: Autoroute announce | Profile 60: Priority setup <B>, hold <C> |
| Profile 30: Autoroute destination ipv6 <C> | Profile 70: Metric TE, Profile 80 |
| Profile 40: Forwarding class <D> | Profile 80: Disjoint service <D> |

The above table shows profiles that include profile identifiers, attributes and parameters, i.e., in the format profile identifier: attribute<parameter>. As shown above a profile may include one or more pairs of attributes and corresponding parameters (argument values). In other examples, each attribute may require one or more parameters as input. For example, a profile identifier may correspond to profile definition of Latency, and the parameters may correspond to minimum and maximum values of latency. Other examples include using a parameter that does not relate to a measureable value but may be an arbitrarily defined number (e.g., a service identifier). For example, a network service may be assigned the number 200. A disjointness request for a path of the network service (e.g., using profile 80 in the above table) may comprise a path computation request including the profile identifier and the number assigned to the service (e.g., 80, 200). Thus, many services are enabled to utilize the same profile but may specify different numbers (corresponding to different services) in the request. In other examples, a profile identifier may be used as a parameter for a profile. For example, profile 70 in the above table requires both Metric TE and profile 80 are satisfied. Any reference to profile 70 also results in a reference to profile 80, which requires input of a service identifier. Thus a message utilizing profile 70 may contain the list (70, 80, 200), where 200 is the service identifier. In this example, not only the content but also the order of the values in the message encodes important information about a relationship between the elements in the message (e.g., that 200 is an argument for input to 80, and that 80 is an input to 70).

In some embodiments, a profile object (e.g., profile object 300, FIG. 3) may contain values (e.g., parameters, argument values) encoded as one or more profile IDs. Moreover, the values may be numerical values that can be directly used (i.e., in a raw, unprocessed fashion) as arguments associated with profile IDs. For example, after the value (e.g., the value may be 20) is parsed from the profile object, the value may be directly used as input for a partially defined profile. In an embodiment, the value may not be used to identify to a profile and is only used as input to an already identified profile. Although the values are numerical values that can be used directly used as arguments, the values (i.e., numerical values) may be encoded as one or more profile IDs (from the perspective of the extended protocol described herein).

In addition, several embodiments of the present disclosure relate to using messages (e.g., PCEP messages) containing one or more profile identifiers to (implicitly) communicate constraints (i.e., constraints that are not explicitly included in a PCEP message). However, when referencing partially defined profiles, a message may contain a profile identifier in combination with one ore more parameters or argument values associated with the profile identifier. For example, a profile identifier may correspond to profile definition of Latency, and the arguments may correspond to a 10 ms minimum and a 20 ms maximum value for latency. The units, in this case milliseconds may or may not be explicitly included in a message. If the units are not explicitly included in the message, then the peers (e.g., a PCE and a PCC) can agree on the units, in which to send the value, prior to sending the message.

In some embodiments, an order of components (e.g., profile identifiers, argument values) in a message (e.g., a PCEP message) and/or profile definition may be used to specify a relationship the components. For example, an order of one or more profile identifiers may be used to specify a relationship between the profile identifiers. For example, a PCEP message may contain one or more profile identifiers, where the order of the profile identifiers specifies that a second profile identifier in the message is argument to a first profile identifier. In an ordered data structure, the first profile identifier may come before the second profile identifier. The first profile ID may be the first in the order and the second profile id may be second in the order. The syntax and/or semantics of profile IDs are independent of PCEP protocol and may be, e.g., controlled by a system operator. Thus, the system operator may decide any way to represent the syntax and semantics of the profile IDs. For example, multiple profile IDs contained in a single profile object may be used to represent an unordered collection (e.g., a set) or an ordered collection (e.g., a list). In an unordered collection, the order of the elements (e.g., profile IDs and/or argument values) or duplicate elements within the collection may be ignored. For example, an unordered set containing the values 10 and 20 may be represented as {10, 20}={20, 10}={10, 20, 20, 10}. Thus, all combinations and permutations of the values 10 and 20 are equal to one another. In an ordered list, the order of the elements in the collection may represent a relationship between the elements, thus the order may not be ignored. For example, an ordered list containing values 10 and 20 may be represented as (10, 20)≠(20, 10)≠(10, 20, 20, 10). Thus, all combinations and permutations of the profiles IDs 10 and 20 are not equal to one another. An ordered collection of elements (e.g., profile IDs and parameters to the profile ID in a PCEP message) may be used to advantageously implement parameterized functions and/or hierarchies with arbitrary breadth and width.

In one example, a first network element for transmitting the ordered list and a second network element for receiving the order list both access data describing the syntax and/or semantics of each of a plurality of profile IDs in a profile object (e.g., each network element may access a same instance or separate instances of the data). The transmitter (i.e., the first network element) may generate the ordered list based on the data. The receiver (i.e., the second network element) may parse the elements of the order collection based on the data. In some examples, the parsing may include using the data to identify, from the elements in the ordered list, profile IDs and corresponding argument values associated with to the profile IDs. The receiver may identify profiles based on the parsing. In addition, the receiver may act upon the identified profiles (e.g., by computing a path based on identified profiles and argument values associated with the identified profiles, or by setting up a path based on identified profiles and argument values associated with the identified profiles).

Figure 19:
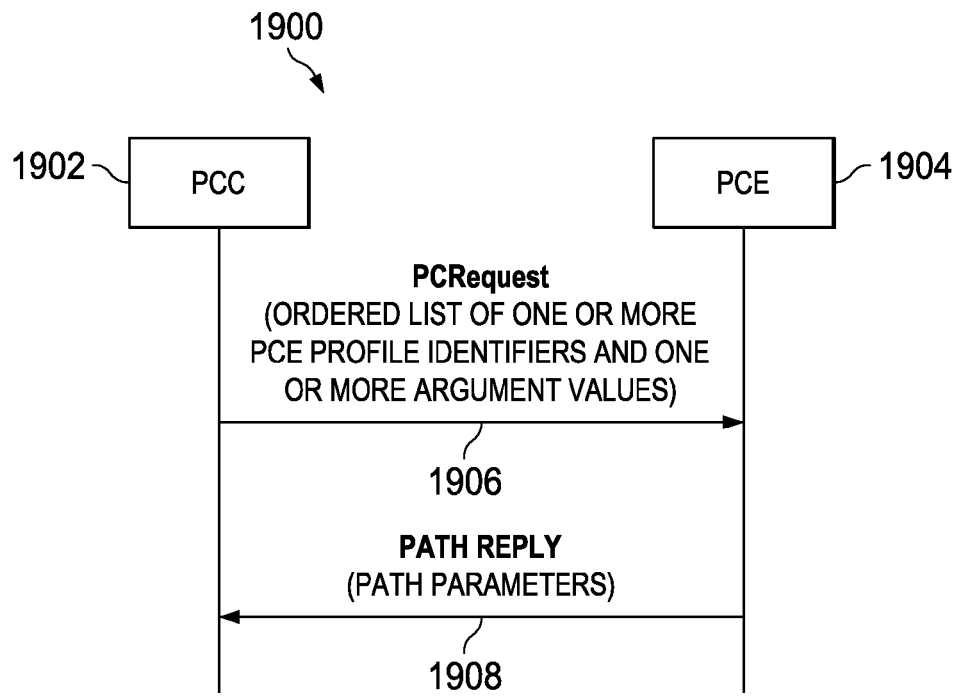
FIG. 19 is a simplified schematic diagram illustrating messages generated by a system for PCC-initiated paths, according to an embodiment of the disclosure.

FIG. 19 is a simplified schematic diagram illustrating messages generated by a system for PCC-initiated paths, according to an embodiment of the disclosure. System 1900 comprises PCC 1902 and PCE 1904. PCE 1904 may receive (e.g., from a profile provisioning system) one or more partially defined PCE profiles. In an embodiment, PCE 1904 may receive one or more ordered lists each comprising a profile identifier and at least one attribute associated with the profile identifier. A partially defined profile may be stored as an ordered list. PCE 1904 may store, in a memory accessible by a PCE 1904, the one or more ordered lists. In one example, the profile identifier and the at least one attribute are provided in a particular order in the ordered list. The particular order of the list may be predetermined e.g., based on a hierarchical relationship between the profile identifier and the at least one attribute. For example, in the hierarchical relationship, the profile identifier may be a parent node of a plurality of nodes in a tree data structure and the at least one attribute may be a child node of the plurality of nodes in the tree data structure. The tree data structure may be a binary tree (e.g., where each node has no more than 2 child nodes) or an n-nary tree (e.g., where each node has no more than n child nodes). In other examples, each node may have only one child. In an implementation, the particular order of the ordered list can correspond to an order of nodes encountered in a depth-first traversal of a plurality of nodes in a tree data structure.

PCC 1902 transmits a path computation request message (e.g., a PCReq) 1906 to PCE 1904 using an extended PCEP protocol (e.g., the extended PCEP protocol as described herein with respect to FIGS. 2-4, and/or 22). System 1900 is similar to system 800. A key difference between systems 1900 and 800 is that, in contrast to system 800, path computation request message 1906, in system 1900, the path computation request message comprises an ordered list of one or more profile IDs (e.g., PCE profile IDs) and one or more argument values. In some examples, PCC 1902 may the request message in response to detecting a network state that is local to the PCC. The message transmitted (e.g., the path computation request message) by PCC 1902 to PCE 1094 may cause PCE 1904 to execute an action. The action many be executed in response to determining that the order in the message corresponds to a particular order of a profile identifier and at least one attribute associated with the profile identifier stored on the second network element. PCE 1904 receives the path computation request message, from the PCC, comprising an ordered list of one or more profile identifiers (e.g., PCE profile IDs) and one or more argument values. Each of the one or more argument values may be associated with a profile identifier in the one or more profile identifiers. PCE 1904 may determine whether the one or more profile identifiers in the message are equal to a profile identifier stored in memory (i.e., for which the PCE has a profile definition). In response to determining that the at least one profile identifier in the message is equal to the profile identifier, PCE 1904 processes the message to identify the at least one argument value based on the particular order in the ordered list. PCEP 1904 may execute an action based on the at least one argument value identified in the processing. The action may be one or more of verifying the validity of the argument value, generating a path reply message based on the argument value, etc. PCE 1904 may generate a reply message (e.g., path reply message 1908) including path parameters that describe a path. The path may be a path from the PCE to a destination. The path satisfies the profile IDs and the argument values for the profile IDs that were sent to the PCE form the PCC. The path parameters may be generated based the one or more profile identifiers and the one or more argument values. For example, the path parameters may specify a bandwidth value that was retrieved (e.g., copied, translated) from argument values. The PCE executed the action to generate a PCEP path computation reply message, to generate the path parameters based on the argument vales, etc.

In some embodiments, the PCE profiles (e.g., IDs and definition) may be solely stored on the PCE (e.g., and not accessibly by the PCC). In other examples, the PCE profiles (e.g., IDs and definition) may be accessible by the PCC. In one implementation, the one or more argument values may be stored in a portion of a PCEP message that is typically used for profile identifiers (e.g., a profile identifier field within a Profile ID TLV, or in an extended profile id field within a Profile ID TLV). Thus, from the perspective of the PCEP message, an argument value may be encoded as (and appear to be a profile ID). Because the extended PCEP messages for profiled IDs (disclosed herein) allow end users (e.g., system operators) to define the semantics of profile IDs in a PCEP message, the PCEP message may be used to carry an argument value within a field designated for a profile ID.

In an embodiment, the order of an ordered list (e.g., an ordered list of Profile IDs and argument values and/or an ordered list of Profile IDS and attributes) may be predetermined, e.g. by a provisioning system prior to providing the profiles to the PCE. The order may indicate a particular order in which the profile identifiers and the attributes should be received (e.g., when received from a PCC). An attribute may include an abstract constraint for which a value is required to implement the constraint. For example, Latency (or min. Latency) may be used as an attribute and may be implemented with a specific value for latency (e.g., 5 ms). In one example, an attribute may correspond to a profile (e.g., reference by its profile ID) configured to accept parameters and/or argument values as input to the profile. As another example, an ordered list may contain profile id (e.g., profile id 10) and attributes (e.g., BFD interval, multiplier), where a particular order is (profile id 10, BFD interval, multiplier). In another example, a different particular order may be (profile id 10, multiplier, BFD interval). In these examples the following orders are not equal to one another (profile id 10, multiplier, BFD interval)≠(profile id 10, multiplier, BFD interval). When the PCE receives a message (e.g., a path computation request message) containing a profile identifier, the PCE may use the memory to identify a profile corresponding to the profile ID. The profile contains the specific order of one or more profile identifiers and the at least one attribute. Using the order retrieved from the memory, the PCE can identify the argument that corresponds to the attribute (since the value of arguments in the message should be in the order (with respect to the profile ID) retrieved from the memory. In other words, a profile identifier and corresponding argument value may be provided in the message in an order that matches (or corresponds to) a particular order of a profile identifier and an attribute in the ordered list (i.e., stored in the memory). The PCE may further identify the location of the argument value in the message based on the location of the attribute in the profile. The PCE is able to use the order of the pairs of attributes and parameters stored within the profile definition to identify the argument values in a request message. For example, the profile definition may have the following order (profile ID, attribute1, attribute2). In this example, when the PCE identifies the profile ID in a request message, it can use the value that immediately follows the profile ID as the argument values for attribute1, and the next consecutive value as the argument value for attribute2.

In an implementation, PCE 1904 may implement logic 1000, in addition to or in combination with the above described logic. PCC 1902 may implement logic 900, in addition to or in combination with the above described logic. The components and logic of system 1900 may be implemented as described with respect to FIGS. 8, 9 and 10.

Figure 20:
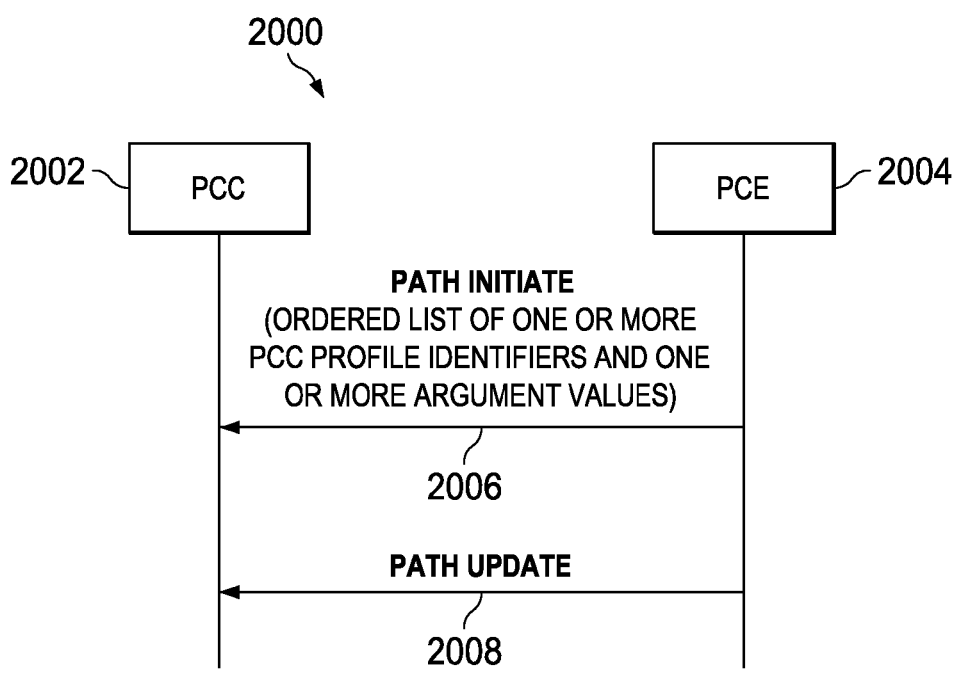
FIG. 20 is a simplified schematic diagram illustrating messages generated by a system for PCE-initiated paths, according to an embodiment of the disclosure.

FIG. 20 is a simplified schematic diagram illustrating messages generated by a system for PCE-initiated paths, according to an embodiment of the disclosure. System 2000 comprises PCC 2002 and PCE 2004. PCC 2002 may receive (e.g., from a profile provisioning system) one or more partially defined PCC profiles. In an embodiment, PCC 2002 may receive one or more ordered lists each comprising a profile identifier and at least one attribute associated with the profile identifier. A partially defined profile (e.g., a PCC profile) may be stored as an ordered list. PCC 2002 may store, in a memory accessible by a PCC 2002, the one or more ordered lists. In one example, the profile identifier and the at least one attribute are provided in a particular order in the ordered list. The particular order of the list may be predetermined e.g., based on a hierarchical relationship between the profile identifier and the at least one attribute. For example, in the hierarchical relationship the profile identifier may be a parent node of a plurality of nodes in a tree data structure and the at least one attribute may be a child node of the plurality of nodes in the tree data structure. The tree data structure may be a binary tree (e.g., where each node has no more than 2 child nodes) or an u-nary tree (e.g., where each node has no more than n child nodes). In other examples, each node may have only one child. In an implementation, the particular order of the ordered list can correspond to an order of nodes encountered in a depth-first traversal of a plurality of nodes in a tree data structure.

PCE 2004 transmits a path initiation message (e.g., a PCInitiate) 2006 to PCC 2002 using an extended PCEP protocol (e.g., the extended PCEP protocol as described herein with respect to FIGS. 2-4, and/or 22). System 2000 is similar to system 1400. A key difference between systems 2000 and 1400 is that, in contrast to system 1400, path initiation message 2006, in system 2000, comprises an ordered set of one or more PCE Profile IDs and one of more argument values. The message transmitted (e.g., the path initiate message) by PCE 2004 to PCC 2002 may cause PCE 2002 to execute an action in response to determining that the order in the message corresponds to a particular order of a profile identifier and at least one attribute associated with the profile identifier stored on the second network element. PCC 2002 receives the path initiation message, from PCE 2004, comprising an ordered list of one or more profile identifiers (e.g., PCE profile IDs) and one or more argument values. Each of the one or more argument values may be associated with a profile identifier in the one or more profile identifiers. PCC 2002 may determine whether the one or more profile identifiers in the message are equal to a profile identifier stored in memory (i.e., using profiles for which the PCC has a profile definition). In response to determining that the at least one profile identifier in the message is equal to the profile identifier, PCC 2002 processes the message to identify the at least one argument value based on the particular order in the ordered list. PCC 2002 may execute an action based on the at least one argument value identified in the processing. The action may be one or more of verifying the validity of the argument value, generating the path (e.g., setting up or instantiating the path) based on the message (e.g., using path parameters), enforcing utilization of a path to conform to constraint (e.g., a path usage parameter) where the argument values define a value that is acceptable or unacceptable for the constraint, etc.

In some embodiments, the PCC profiles (e.g., IDs and definition) may be solely stored on the PCC (e.g., and not accessibly by the PCC). In other examples, the PCC profiles (e.g., IDs and definition) may be accessible by the PCE. In one implementation, the one or more argument values may be stored (for transmission) in a portion of a PCEP message that is typically used for profile identifiers (e.g., a profile identifier field within a Profile ID TLV, or in an extended profile id field within a Profile ID TLV). Thus, from the perspective of the PCEP message, an argument value may be encoded as (and appear to be a profile ID). Because the extended PCEP messages for profiled IDs (disclosed herein) allow end users (e.g., system operators) to define the semantics of profile IDs in a PCEP message, the PCEP message may be used to carry an argument value within a field designated for a profile ID.

In an embodiment, the order of an ordered list (e.g., an ordered list of Profile IDs and argument values and/or an ordered list of Profile IDs and attributes) may be predetermined, e.g. by a provisioning system prior to providing the profiles to the PCC. The order may indicate a particular order in which the profile identifiers and the attributes should be received (e.g., when received from a PCE). An attribute may include an abstract constraint for which a value is required to implement the constraint. For example, Latency (or min. Latency) may be used as an attribute and may be implemented with a specific value for latency (e.g., 5 ms). In one example, an attribute may correspond to a profile (e.g., reference by its profile ID) configured to accept parameters and/or argument values as input to the profile. As another example, an ordered list may contain profile id (e.g., profile id 20) and attributes (e.g., priority setup, hold), where a particular order is (profile id 20, priority setup, hold). In another example, a different particular order may be (profile id 10, hold, priority setup). In these examples the following orders are not equal to one another (profile id 20, priority setup, hold) (profile id 10, hold, priority setup). When the PCC receives a message (e.g., a path initiate message) containing a profile identifier, the PCC may use the memory to identify a profile corresponding to the profile ID, which contains the specific order of one or more profile identifiers and the at least one attribute. Using the order retrieved from the memory, the PCC can identify the argument that corresponds to the attribute, e.g., since the value of arguments in the message should be in the order (with respect to the profile ID) retrieved from the memory. In other words, a profile identifier and corresponding argument value may be provided in the message in an order that matches (or corresponds to) a particular order of a profile identifier and an attribute in the ordered list (i.e., stored in the memory). The PCC may further identify the location of the argument value in the message based on the location of the attribute in the profile. The PCC is able to use the order of the pairs of attributes and parameters stored within the profile definition to identify the argument values in a request message. For example, the profile definition may have the following order (profile ID, attribute1, attribute2). Thus, when the PCE identifies the profile ID in a request message, it can use the value that immediately follows the profile ID as the argument values for attribute1, and the next consecutive value as the argument value for attribute2.

In an implementation, PCC 2002 may implement logic 1500, in addition to or in combination with the above described logic. PCE 2004 may implement logic 1600, in addition to or in combination with the above described logic. The components and logic of system 1900 may be implemented as described with respect to FIGS. 14, 15 and 16.

FIG. 21 is a table of exemplary encodings for profile objects, according to an embodiment of the present disclosure. The exemplary encodings illustrate ways in which elements (e.g., profile IDS, argument values, attributes, etc.) may be placed in a specific ordered to encode a relationship between the elements. Table 2100 in FIG. 21, illustrates tree data structures (in row 2102), where each tree contains a root nodes (i.e., nodes a, b, c, and d) corresponds to profile object (e.g., profile object 300). This tree represents an unordered set. In contrast, each of trees b, c, d and e represent an ordered list. The trees illustrate a hierarchical relationship between the nodes. Each of nodes that descend from the root node (i.e., are child nodes of the root node) corresponds to profile IDs and/or argument values. Each root node has one or more child nodes. In turn, each child may have child nodes of its own. In general, each node (whether root, child, and/or leaf) can comprise zero or more child nodes. Each of nodes 5, 6, 7, and 9 represent a attribute (each referenced using a profile id equal to the node number) due, at least in part, to the fact that the nodes (i.e., the profile) utilize argument values (also called "parameters" in FIG. 21) as input. Each argument value corresponds to an attribute. Each attribute may correspond to one or more argument values (e.g., attribute 9 receives as input argument values 1 and 4).

Tree a: Root node "a" comprises child nodes 1 and 2. In turn, nodes 1 and 2 are leafs and have no children. This tree represents an unordered set of profile identifiers.

Tree b: Root node "b" comprises child nodes 5 and 8. Node 5 is a attribute (or a profile Id that accepts parameters as argument values) and comprises child node 1. Node 1 is a parameter used as input to node 5 (i.e., attribute 5). Node 5 has no children and is therefore a leaf node. Likewise, node 8 is a leaf node. Node 8 corresponds to a policy of disjointness between other paths associated with the profile identifier.

Tree c: Root node "c" comprises child nodes 6 and 7. Node 6 is a attribute (or a profile Id that accepts parameters as argument values) and comprises child nodes 1 and 2. Both of nodes 1 and 2 are parameters, which are used as input to node 6 (i.e., attribute 6). Nodes 1 and 2 are also leaf nodes. Node 7 is a attribute and comprises child nodes 3, 2, 4, and 1 (in that order). Each of nodes 3, 2, 4, and 1 is a parameter, which is used as input to node 7 (i.e., attribute 7). Each of nodes 3, 2, 4, and 1 is a leaf node. Note the nodes 1 and 2 under node 6 are not the same as (e.g., contain different values) nodes 1 and 2 under node 7.

Tree d: Root node "d" comprises child nodes 9 and 7. Node 9 is a attribute and comprises child nodes 1 and 4. Both of nodes 1 and 4 are parameters, which are used as input to node 9 (i.e., attribute 9). Nodes 1 and 4 are also leaf nodes. Node 7 is a attribute and comprises child nodes 3, 5, and 6 (in that order). Each of nodes 3, 5, and 6 is a parameter, which is used as input to node 7 (i.e., attribute 7). Each of nodes 3, and 5 is a leaf node. Node 6 is a attribute that is nested under node 7 (i.e., attribute 7). Node 6 comprises child nodes 1 and 4, which each represent a parameter used as input to node 9. Note the nodes 1 and 2 under node 9 are not the same as (e.g., contain different values) nodes 1 and 2 under node 7.

The example encodings is row 2104 may be encoded using Profile ID TLV 400 (FIG. 4). For example for tree with root node b, the encoding described in row 2104 may be encoded using an instance of a profile object (e.g., profile object 300) comprising three Profile ID TLVs (e.g., 400) corresponding to the contents 5, 1 and 8. Thus, a first Profile ID TLV may contain a profile identifier equal to 5, a second Profile ID TLV may contain a profile identifier equal to 1, and a third Profile ID TLV may contain a profile identifier equal to 8. Note that the second Profile ID TLV has the value of the profile identifier field set to an argument value (i.e., and not to a profile id). For each tree, the profile object contents are listed in an order that they are encountered using a depth-first traversal of the tree.

Figure 22:
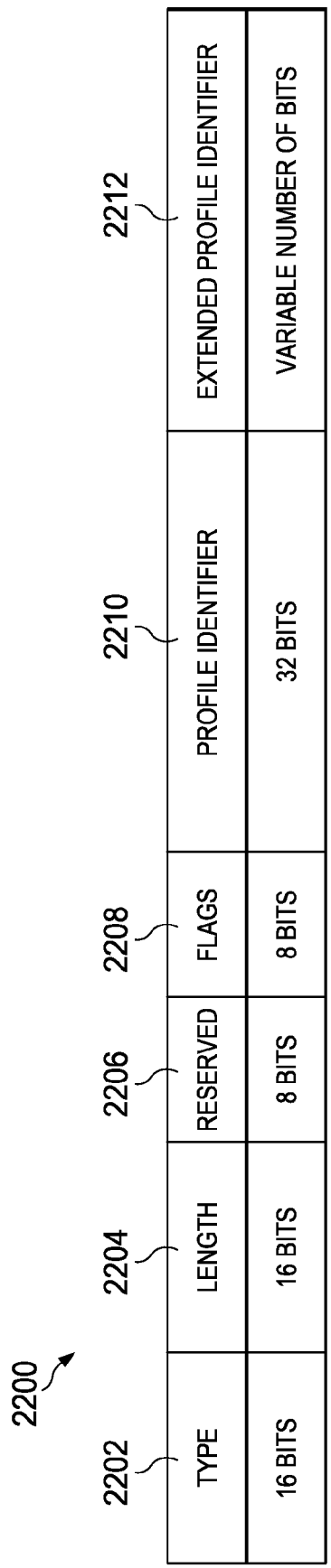
FIG. 22 illustrates a profile identifier TLV, which extends PCEP, according to an embodiment of the present disclosure.

The example encodings is row 2106 may be encoded using a Profile ID TLV including an extended profile identifier field. For example, FIG. 22 illustrates a profile identifier TLV, which extends PCEP, according to an embodiment of the present disclosure. Profile ID TLV 2200 is an alternative to Profile ID TLV 400. Profile ID TLV 2200 comprises a 16-bit type 2202, a 16-bit length 2204, an 8-bit reserved portion 2206, and 8-bits for flags 2208, and 32-bit profile identifier 2210, and a variable bit length extended profile identifier 2212. The profile identifier 2210, may be utilized as a PCC profile identifier or as PCE profile identifier (e.g., for PCE-initiated paths, PCC-initiated paths, or both). The extended profile identifier 2212 may have a length of zero or more bits. The value of the length field 2204 represents the length (in bits) of the Profile ID TLV (e.g., as measured from the start of Reserved field 2206 to the end of the extended profile identifier field 2212). With the exception of extended profile identifier 2212, the lengths of all fields in are fixed (each field having a length (in bits) shown in FIG. 22). Thus, the value of length field 2204 may be used to determine the length of the extended profile identifier 2212 (e.g., by the subtracting length of the fixed length fields from the actual length of the Profile ID TLV). In some examples, the extended identifier section is utilized to encode parameters values (argument values) that associated with the particular profile identifier in a given Profile ID TLV.

In an embodiment, the encodings of profile object described with respect to row 2106 (in FIG. 21) can be encoded in using Profile ID TLV 2200. For example for tree with root node b, the encoding described in row 2106 may be encoded using an instance of a profile object (e.g., profile object 300) comprising two Profile ID TLVs (e.g., 2200) corresponding to the contents 5.1 and 8. For content 5.1, 5 represented the profile id and the 1 represents the argument value (or parameter). The dot (".") Is used to delineate the two values when the argument value is appended to the profile ID (thereby extending the profile ID). Thus, in this example the, a first Profile ID TLV may contain a profile identifier equal to 5, with an extended profile identifier equal to 1. For content 8, "8" represents the profile id (there are no argument values for profile id 8). A second Profile ID TLV may contain a profile identifier equal to 8, with an extended profile identifier that is (e.g., null). For each tree, the profile object contents are listed in an order that they are encountered using a depth-first traversal of the tree.

In other implementations, the example encodings is row 2104 may be encoded using Profile ID TLV 2200 (FIG. 22), e.g., by leaving extended profile id empty.

Variations and Implementations

As used herein, the PCEs and PCCs are nodes that can facilitate the centralized path definition with distributed path setup control and/or the centralized path setup control with distributed path utilization constraints activities discussed herein. As used herein in this Specification, the components of the framework, or "nodes" is meant to encompass routers, switches, cable boxes, gateways, bridges, loadbalancers, access concentrators, firewalls, inline service nodes, proxies, servers, processors, modules, or any other suitable device, component, element, proprietary appliance, or object operable to exchange information in a network environment. These nodes may include any suitable hardware, software, components, modules, interfaces, or objects that facilitate the operations thereof. This may be inclusive of appropriate algorithms, communication protocols, and interfaces that allow for the effective exchange of data or information for centralized path definition with distributed path setup control and for centralized path setup control with distributed path utilization constraints. A PCC and/or and PCE may be a node. These nodes are network nodes and different from the nodes in the tree data structure in FIG. 21. The nodes in FIG. 21 related to a data structure for storing relationships between objects.

In one implementation, one or more of the nodes include software to achieve (or to foster) the centralized path definition with distributed path setup control and/or the centralized path setup control with distributed path utilization constraints activities discussed herein. This could include, for example, the implementation of instances of software modules (where these modules interact, perform reciprocating functions, and/or suitably coordinate their activities with peers). Additionally, each of these elements can have an internal structure (e.g., a processor, a memory element, etc.) to facilitate some of the operations described herein. In other embodiments, these centralized path definition with distributed path setup control activities may be executed externally to these elements, or included in some other network element (or node) to achieve the intended functionality. Alternatively, one or more of the nodes may include software (or reciprocating software) that can coordinate with other network elements (or nodes) in order to achieve the centralized path definition with distributed path setup control activities described herein. In still other embodiments, one or several devices may include any suitable algorithms, hardware, software, components, modules, interfaces, or objects that facilitate the operations thereof.

Note that in certain example implementations, the functions outlined herein associated with centralized path definition with distributed path setup control and centralized path setup control with distributed path utilization constraints may be implemented in logic encoded in one or more non-transitory media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory can store data used for the operations described herein. This includes the memory being able to store instructions (e.g., software, logic, processor instructions, etc.) that can be executed to carry out the activities described in this Specification. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Furthermore, various memory items (e.g., databases, tables, queues, buffers, caches, trees, etc.) should be construed as being encompassed within the broad term 'memory element.' Similarly, any of the potential processing elements, modules, and machines described in this Specification should be construed as being encompassed within the broad term 'processor.'

Note that with the example provided above, as well as numerous other examples provided herein, interaction may be described in terms of two, three, or four network elements or nodes. However, this has been done for purposes of clarity and example only. In certain cases, it may be easier to describe one or more of the functionalities of a given set of flows by only referencing a limited number of network elements (or nodes). It should be appreciated that the present disclosure (and its teachings) are readily scalable and can accommodate a large number of components, as well as more complicated/sophisticated arrangements and configurations. Accordingly, the examples provided should not limit the scope or inhibit the broad teachings of the present disclosure as potentially applied to a myriad of other architectures.

It is important to note that the steps illustrated in the present disclosure illustrate only some of the possible signaling scenarios and patterns that may be executed by, or within, one or more nodes. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. If desired, the different functions discussed herein may be performed in a different order and/or concurrently with each other. Furthermore, if desired, one or more of the above-described functions may be optional or may be combined. The preceding operational flows have been offered for purposes of example and discussion. Substantial flexibility is provided by the one or more nodes in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Additionally, although the one or more nodes has been illustrated with reference to particular elements and operations that facilitate the centralized path definition with distributed path setup control process, these elements and operations may be replaced by any suitable architecture or process that achieves the intended functionality of these one or more nodes.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   storing, in a memory accessible by a path computation client (PCC), at least one profile identifier;
   generating, by the PCC, a path computation element communication protocol (PCEP) request message comprising a destination identifier and a profile identifier of the at least one profile identifier, wherein the generating the PCEP request message is in response to detecting a network state that is local to the PCC by determining which of the at least one profile identifier is the profile identifier corresponding to a network service associated with a peer node and determining that a path from the PCC to the peer node does not exist for the profile identifier, wherein the peer node is a destination associated with the destination identifier;

transmitting, from the PCC, the PCEP request message to a path computation element (PCE); and receiving, by the PCC from the PCE, a PCEP reply message comprising a path from the PCC to the destination associated with the destination identifier, wherein the path satisfies at least one path constraint, stored remote from the PCC, corresponding to the profile identifier.

2. The method of claim 1, wherein the PCC has no information regarding the at least one path constraint corresponding to the profile identifier.

3. The method of claim 1, wherein the at least one path constraint a path policy, stored on the PCE, specifying that any path generated based on the path policy must be fully disjoint from another path generated based on the path policy, and wherein the path is determined based on the path policy.

4. The method of claim 3, further comprising:
generating, by the PCC, another PCEP request message comprising another destination identifier and the path policy;
receiving, by the PCC from the PCE, an additional PCEP reply message comprising an additional path from the PCC to a destination associated with the another destination identifier, wherein the additional path is fully disjoint from the path based on the path policy.

5. The method of claim 1, further comprising:
receiving, by the PCC from the peer node, a message identifying that the peer node is associated with the network service, wherein the message comprises an attribute corresponding to the network service advertised.

6. The method of claim 1, wherein a policy, on the PCC, instructs the PCC as to which profile identifier of the at least one profile identifier corresponds to the detected network state that is local to the PCC.

7. The method of claim 1, wherein the PCEP request message, generated by the PCC, further comprises at least one additional path constraint, and wherein the path is further computed based on the at least one additional path constraint.

8. The method of claim 7, wherein the at least one path constraint and/or the at least one additional path constraint comprise one or more of Explicit Route Object (ERO), bandwidth, affinities, administrative group, path characteristics, metric type, hop limit, priorities, setup, hold, symbolic name, record route, a label stack, an instance of a path template, an amount of available bandwidth, a traffic engineering metric, an Border Gateway Protocol community value, a category of tagged routes within a Border Gateway Protocol community, an Interior Gateway Protocol (IGP) metric, administrative group, and/or hop count.

9. A method comprising:
storing, in a memory accessible by a path computation element (PCE), at least one profile identifier and at least one corresponding path constraint;
receiving, at the PCE from a path computation client (PCC), a path computation element communication protocol (PCEP) request message comprising a destination identifier and a profile identifier of the at least one profile identifier, wherein the PCC generated the PCEP request message in response to detecting a network state that is local to the PCC, the network state that is local to the PCC comprises the PCC determining that a path from the PCC to a peer node for a network service does not exist for the profile identifier;

generating, by the PCE, a PCEP reply message comprising path computation parameters describing a path from the PCC to a destination associated with the destination identifier, wherein the path computation parameters are computed by the PCE based on the at least one corresponding path constraint for the profile identifier.

10. The method of claim 9, wherein the PCE has no information regarding the network state that is local to the PCC.

11. The method of claim 9, wherein the at least one corresponding path constraint for the profile identifier comprises a path policy specifying that any path generated based on the path policy must be fully disjoint from another path generated based on the path policy, and wherein the path is determined based on the path policy.

12. The method of claim 11, further comprising:
receiving, at the PCE, another PCEP request message comprising another destination identifier and the path policy;
generating, by the PCE, an additional PCEP reply message comprising an additional path from the PCC to a destination associated with the another destination identifier, wherein the additional path is fully disjoint from the path based on the path policy.

13. The method of claim 9, wherein the PCE is one of a stateful PCE or a stateless PCE, the stateful PCE storing state information for existing paths that were generated by the PCE, wherein the state information comprises paths and corresponding profile identifiers associated with the paths, and the stateless PCE does not store information for existing paths.

14. The method of claim 13, wherein the PCE transmits a path initiation message to the PCC instructing the PCC to instantiate a path to a different destination.

15. A system comprising:
a path computation element (PCE) comprising a memory storing at least one profile identifier and at least one corresponding path constraint;
a path computation client (PCC) comprising a memory storing the at least one profile identifier and not storing the at least one corresponding path constraint;
a communication media operatively coupled to the PCE and the PCC and enabling communication between the PCE and the PCC;
a peer node configured to transmit a message to the PCC identifying that the peer node is associated with a network service
wherein the PCC is configured to transmit, to the PCE via the communication media, a path computation element communication protocol (PCEP) request message comprising a destination identifier and a profile identifier of the at least one profile identifier, wherein the generating the PCEP request message is in response to detecting a network state that is local to the PCC by determining which of the at least one profile identifier is the profile identifier corresponding to a network service associated with a peer node and determining that a path from the PCC to the peer node does not exist for the profile identifier, wherein the peer node is a destination associated with the destination identifier, and wherein the PCE has no information regarding the network state that is local to the PCC; and
wherein the PCE is configured to generate a PCEP reply message, for transmission to the PCC via the communication media, comprising a path from the PCC to a destination associated with the destination identifier, and the path is computed by the PCE based on the at least one corresponding path constraint for the profile identifier.

16. At least one computer-readable non-transitory medium comprising one or more instruction, that when executed by one or more processors configure the one or more processor to perform one or more operations comprising:
    storing, in a memory accessible by a path computation client (PCC), at least one profile identifier;
    generating, by the PCC, a path computation element communication protocol (PCEP) request message comprising a destination identifier and a profile identifier of the at least one profile identifier, wherein the generating the PCEP request message is in response to detecting a network state that is local to the PCC by determining which of the at least one profile identifier is the profile identifier corresponding to a network service associated with a peer node and determining that a path from the PCC to the peer node does not exist for the profile identifier, wherein the peer node is a destination associated with the destination identifier;
    transmitting, from PCC, the PCEP request message to a path computation element (PCE); and
    receiving, by the PCC from the PCE, a PCEP reply message comprising a path from the PCC to the destination associated with the destination identifier, wherein the path satisfies at least one path constraint, stored remote from the PCC, corresponding to the profile identifier.

17. The least one computer-readable non-transitory medium of claim 16, wherein the PCC has no information regarding the at least one path constraint corresponding to the profile identifier.

18. The least one computer-readable non-transitory medium of claim 16, wherein the one or more operations further comprise:
    receiving, by the PCC from the peer node, a message identifying that the peer node is associated with the network service, wherein the message comprises an attribute corresponding to the network service advertised.

19. At least one computer-readable non-transitory medium comprising one or more instruction, that when executed by one or more processors configure the one or more processor to perform one or more operations comprising:
    storing, in a memory accessible by a path computation element (PCE), at least one profile identifier and at least one corresponding path constraint;
    receiving, at the PCE from a path computation client (PCC), a path computation element communication protocol (PCEP) request message comprising a destination identifier and a profile identifier of the at least one profile identifier, wherein the PCC generated the PCEP request message in response to detecting a network state that is local to the PCC, the network state that is local to the PCC comprising the PCC determining that a path from the PCC to a peer node for a network service does not exist for the profile identifier;
    generating, by the PCE, a PCEP reply message comprising a path from the PCC to a destination associated with the destination identifier, wherein the path is computed by the PCE based on the at least one corresponding path constraint for the profile identifier.

20. The least one computer-readable non-transitory medium of claim 19, wherein the PCE has no information regarding the network state that is local to the PCC.

* * * * *